US007882247B2

(12) United States Patent
Sturniolo et al.

(10) Patent No.: US 7,882,247 B2
(45) Date of Patent: Feb. 1, 2011

(54) METHOD AND APPARATUS FOR PROVIDING SECURE CONNECTIVITY IN MOBILE AND OTHER INTERMITTENT COMPUTING ENVIRONMENTS

(75) Inventors: Emil Sturniolo, Medina, OH (US); Aaron Stavens, Auburn, WA (US); Joseph Savarese, Edmonds, WA (US)

(73) Assignee: Netmotion Wireless, Inc., Seattle, WA (US)

( * ) Notice: Subject to any disclaimer, the term of this patent is extended or adjusted under 35 U.S.C. 154(b) by 663 days.

(21) Appl. No.: 10/340,833

(22) Filed: Jan. 13, 2003

(65) Prior Publication Data

US 2003/0182431 A1 Sep. 25, 2003

Related U.S. Application Data

(63) Continuation of application No. 09/660,500, filed on Sep. 12, 2000, now Pat. No. 7,293,107, and a continuation of application No. 09/330,310, filed on Jun. 11, 1999, now Pat. No. 6,546,425.

(60) Provisional application No. 60/347,243, filed on Jan. 14, 2002.

(51) Int. Cl.
*G06F 15/177* (2006.01)
(52) U.S. Cl. .................. 709/228; 709/225; 709/229
(58) Field of Classification Search ................ 709/231, 709/225–229; 726/12
See application file for complete search history.

(56) References Cited

U.S. PATENT DOCUMENTS

| | | | |
|---|---|---|---|
| 4,697,281 A | 9/1987 | O'Sullivan | |
| 4,799,253 A | 1/1989 | Stern et al. | |
| 4,833,701 A | 5/1989 | Comroe et al. | |
| 4,837,800 A | 6/1989 | Freeburg et al. | |
| 4,893,327 A | 1/1990 | Stern et al. | |
| 4,912,756 A | 3/1990 | Hop | |
| 4,969,184 A | 11/1990 | Gordon et al. | |
| 4,972,457 A | 11/1990 | O'Sullivan | |
| 4,989,230 A | 1/1991 | Gillig et al. | |
| 5,042,082 A | 8/1991 | Dahlin | |
| 5,109,528 A | 4/1992 | Uddenfeldt | |
| 5,127,041 A | 6/1992 | O'Sullivan | |

(Continued)

FOREIGN PATENT DOCUMENTS

CA 2303987 3/1999

(Continued)

OTHER PUBLICATIONS

Netmotion Wireless: "Extending Mobile Solutions Without Middleware," White Paper 'Online!, XP002324100 (Aug. 6, 2001).

(Continued)

*Primary Examiner*—Patrice L Winder
(74) *Attorney, Agent, or Firm*—Nixon & Vanderhye PC

(57) ABSTRACT

Method and apparatus including a mobility server enables secure connectivity using standards-based Virtual Private Network (VPN) IPSEC algorithms in a mobile and intermittently connected computing environment. Transitions between and among networks occur seamlessly—with a mobility server being effective to shield networked applications from interruptions in connectivity. The applications and/or users need not be aware of these transitions, although intervention is possible.

22 Claims, 17 Drawing Sheets

U.S. PATENT DOCUMENTS

| | | |
|---|---|---|
| 5,159,592 A | 10/1992 | Perkins |
| 5,166,931 A | 11/1992 | Riddle |
| 5,173,933 A | 12/1992 | Jabs et al. |
| 5,181,200 A | 1/1993 | Harrison |
| 5,212,684 A | 5/1993 | MacNamee et al. |
| 5,212,724 A | 5/1993 | Nazarenko et al. |
| 5,212,806 A | 5/1993 | Natarajan |
| 5,224,098 A | 6/1993 | Bird et al. |
| 5,249,218 A | 9/1993 | Sainton |
| 5,257,401 A | 10/1993 | Dahlin et al. |
| 5,260,988 A | 11/1993 | Schellinger et al. |
| 5,276,680 A | 1/1994 | Messenger |
| 5,291,544 A | 3/1994 | Hecker |
| 5,307,490 A | 4/1994 | Davidson et al. |
| 5,310,997 A | 5/1994 | Roach et al. |
| 5,325,361 A | 6/1994 | Lederer et al. |
| 5,325,362 A | 6/1994 | Aziz |
| 5,327,577 A | 7/1994 | Uddenfeldt |
| 5,349,678 A | 9/1994 | Morris et al. |
| 5,353,334 A | 10/1994 | O'Sullivan |
| 5,367,563 A | 11/1994 | Sainton |
| 5,379,448 A | 1/1995 | Ames et al. |
| 5,404,392 A | 4/1995 | Miller et al. |
| 5,410,543 A | 4/1995 | Seitz et al. |
| 5,412,375 A | 5/1995 | Wood |
| 5,412,654 A * | 5/1995 | Perkins .................. 370/312 |
| 5,420,574 A | 5/1995 | Erickson et al. |
| 5,426,637 A | 6/1995 | Derby et al. |
| 5,434,863 A | 7/1995 | Onishi et al. |
| 5,442,633 A | 8/1995 | Perkins et al. |
| 5,442,791 A | 8/1995 | Wrabetz et al. |
| 5,446,736 A | 8/1995 | Gleeson et al. |
| 5,448,619 A | 9/1995 | Evans et al. |
| 5,452,471 A | 9/1995 | Leopold et al. |
| 5,457,680 A | 10/1995 | Kamm et al. |
| 5,475,819 A | 12/1995 | Miller et al. |
| 5,479,480 A | 12/1995 | Scott |
| 5,481,535 A | 1/1996 | Hershey |
| 5,490,139 A | 2/1996 | Baker et al. |
| 5,491,800 A | 2/1996 | Goldsmith et al. |
| 5,499,343 A | 3/1996 | Pettus |
| 5,504,746 A | 4/1996 | Meier |
| 5,504,935 A | 4/1996 | Vercauteren |
| 5,515,508 A | 5/1996 | Pettus et al. |
| 5,530,945 A | 6/1996 | Chavez, Jr. et al. |
| 5,537,220 A | 7/1996 | Ezumi et al. |
| 5,548,723 A | 8/1996 | Pettus |
| 5,550,893 A | 8/1996 | Heidari |
| 5,555,553 A | 9/1996 | Jonsson |
| 5,559,800 A | 9/1996 | Mousseau et al. |
| 5,559,860 A | 9/1996 | Mizikovsky |
| 5,564,070 A | 10/1996 | Want et al. |
| 5,564,077 A | 10/1996 | Obayashi et al. |
| 5,566,225 A | 10/1996 | Haas |
| 5,566,236 A | 10/1996 | MeLampy et al. |
| 5,568,645 A | 10/1996 | Morris et al. |
| 5,572,528 A | 11/1996 | Shuen |
| 5,574,774 A | 11/1996 | Ahlberg et al. |
| 5,594,731 A | 1/1997 | Reissner |
| 5,598,412 A | 1/1997 | Griffith et al. |
| 5,602,843 A | 2/1997 | Gray |
| 5,602,916 A | 2/1997 | Grube et al. |
| 5,610,595 A | 3/1997 | Garrabrant et al. |
| 5,610,905 A | 3/1997 | Murthy et al. |
| 5,610,974 A | 3/1997 | Lantto |
| H1641 H | 4/1997 | Sharman |
| 5,623,601 A | 4/1997 | Vu |
| 5,625,673 A | 4/1997 | Grewe et al. |
| 5,627,831 A * | 5/1997 | Azmak .................. 370/332 |
| 5,633,868 A | 5/1997 | Baldwin et al. |
| 5,633,873 A | 5/1997 | Kay et al. |
| 5,657,390 A | 8/1997 | Elgamal et al. |
| 5,659,596 A | 8/1997 | Dunn |
| 5,664,007 A | 9/1997 | Samadi et al. |
| 5,666,653 A | 9/1997 | Ahl |
| 5,668,837 A | 9/1997 | Dent |
| 5,673,268 A | 9/1997 | Sharma et al. |
| 5,673,322 A | 9/1997 | Pepe et al. |
| 5,682,534 A | 10/1997 | Kapoor et al. |
| 5,697,055 A | 12/1997 | Gilhousen et al. |
| 5,710,986 A | 1/1998 | Obayashi et al. |
| 5,717,737 A | 2/1998 | Doviak et al. |
| 5,721,818 A | 2/1998 | Hanif et al. |
| 5,724,346 A | 3/1998 | Kobayashi et al. |
| 5,732,074 A | 3/1998 | Spaur et al. |
| 5,732,076 A | 3/1998 | Ketseoglou et al. |
| 5,732,359 A | 3/1998 | Baranowsky, II et al. |
| 5,745,850 A | 4/1998 | Aldermeshian et al. |
| 5,748,897 A | 5/1998 | Katiyar |
| 5,752,185 A | 5/1998 | Ahuja |
| 5,754,752 A * | 5/1998 | Sheh et al. .................. 714/4 |
| 5,754,774 A | 5/1998 | Bittinger et al. |
| 5,754,961 A | 5/1998 | Serizawa et al. |
| 5,758,186 A | 5/1998 | Hamilton et al. |
| 5,761,623 A | 6/1998 | Lupien et al. |
| 5,768,525 A | 6/1998 | Kralowetz et al. |
| 5,771,459 A | 6/1998 | Demery et al. |
| 5,781,862 A * | 7/1998 | Da Silva et al. .............. 455/436 |
| 5,784,643 A | 7/1998 | Shields |
| 5,790,554 A | 8/1998 | Pitcher et al. |
| 5,793,843 A | 8/1998 | Morris |
| 5,796,727 A | 8/1998 | Harrison et al. |
| 5,802,483 A | 9/1998 | Morris |
| 5,812,819 A | 9/1998 | Rodwin et al. |
| 5,825,775 A | 10/1998 | Chin et al. |
| 5,826,188 A | 10/1998 | Tayloe et al. |
| 5,828,659 A | 10/1998 | Teder et al. |
| 5,835,725 A | 11/1998 | Chiang et al. |
| 5,839,075 A | 11/1998 | Haartsen et al. |
| 5,848,064 A | 12/1998 | Cowan |
| 5,856,974 A | 1/1999 | Gervais et al. |
| RE36,078 E | 2/1999 | Uddenfeldt et al. |
| 5,870,673 A | 2/1999 | Haartsen |
| 5,878,344 A | 3/1999 | Zicker |
| 5,889,816 A | 3/1999 | Agrawal et al. |
| 5,890,054 A | 3/1999 | Logsdon et al. |
| 5,901,352 A | 5/1999 | St. Pierre et al. |
| 5,909,431 A | 6/1999 | Kuthyar et al. |
| 5,910,951 A | 6/1999 | Pearce et al. |
| 5,915,214 A | 6/1999 | Reece et al. |
| 5,918,016 A | 6/1999 | Brewer et al. |
| 5,935,212 A | 8/1999 | Kalajan et al. |
| 5,941,956 A | 8/1999 | Shirakihara et al. |
| 5,943,333 A | 8/1999 | Whinnett et al. |
| 5,956,640 A | 9/1999 | Eaton et al. |
| 5,968,176 A | 10/1999 | Nessett et al. |
| 5,978,679 A | 11/1999 | Agre |
| 5,987,011 A | 11/1999 | Toh |
| 5,987,611 A | 11/1999 | Freund |
| 6,006,090 A | 12/1999 | Coleman et al. |
| 6,032,042 A | 2/2000 | Kauppi |
| 6,038,230 A | 3/2000 | Ofek |
| 6,041,166 A | 3/2000 | Hart et al. |
| 6,052,725 A | 4/2000 | McCann et al. |
| 6,055,236 A * | 4/2000 | Nessett et al. ............... 370/389 |
| 6,078,575 A | 6/2000 | Dommety et al. |
| 6,081,715 A | 6/2000 | LaPorta et al. |
| 6,091,951 A | 7/2000 | Sturniolo et al. |
| 6,101,543 A * | 8/2000 | Alden et al. ................. 709/229 |
| 6,112,085 A | 8/2000 | Garner et al. |
| 6,122,514 A | 9/2000 | Spaur et al. |
| 6,131,121 A | 10/2000 | Mattaway et al. |
| 6,147,986 A | 11/2000 | Orsic |
| 6,154,461 A * | 11/2000 | Sturniolo et al. ............ 370/401 |

| | | |
|---|---|---|
| 6,161,123 A | 12/2000 | Renouard et al. |
| 6,167,513 A | 12/2000 | Inoue et al. |
| 6,170,057 B1 | 1/2001 | Inoue et al. |
| 6,185,184 B1 | 2/2001 | Mattaway et al. |
| 6,195,705 B1 | 2/2001 | Leung |
| 6,198,920 B1 | 3/2001 | Doviak et al. |
| 6,201,962 B1* | 3/2001 | Sturniolo et al. .......... 455/432.2 |
| 6,212,563 B1 | 4/2001 | Beser |
| 6,230,004 B1 | 5/2001 | Hall et al. |
| 6,230,012 B1* | 5/2001 | Willkie et al. ............ 455/435.1 |
| 6,233,616 B1 | 5/2001 | Reid |
| 6,233,617 B1 | 5/2001 | Rothwein et al. |
| 6,233,619 B1 | 5/2001 | Narisi et al. |
| 6,236,652 B1 | 5/2001 | Preston et al. |
| 6,240,514 B1 | 5/2001 | Inoue et al. |
| 6,243,749 B1 | 6/2001 | Sitaraman et al. |
| 6,243,753 B1 | 6/2001 | Machn et al. |
| 6,249,818 B1 | 6/2001 | Sharma |
| 6,252,884 B1 | 6/2001 | Hunter |
| 6,256,300 B1 | 7/2001 | Ahmed et al. |
| 6,256,739 B1 | 7/2001 | Skopp et al. |
| 6,259,405 B1 | 7/2001 | Stewart et al. |
| 6,263,213 B1 | 7/2001 | Kovacs |
| 6,286,052 B1 | 9/2001 | McCloghrie et al. |
| 6,308,273 B1 | 10/2001 | Goertzel et al. |
| 6,308,281 B1 | 10/2001 | Hall, Jr. et al. |
| 6,336,135 B1 | 1/2002 | Niblett et al. |
| 6,400,722 B1 | 6/2002 | Chuah et al. |
| 6,412,025 B1 | 6/2002 | Cheston et al. |
| 6,415,329 B1 | 7/2002 | Gelman et al. |
| 6,418,324 B1 | 7/2002 | Doviak et al. |
| 6,438,594 B1 | 8/2002 | Bowman-Amuah |
| 6,446,200 B1 | 9/2002 | Ball et al. |
| 6,449,259 B1 | 9/2002 | Allain et al. |
| 6,477,156 B1 | 11/2002 | Ala-Laurila et al. |
| 6,477,543 B1 | 11/2002 | Huang et al. |
| 6,484,261 B1 | 11/2002 | Wiegel |
| 6,496,491 B2 | 12/2002 | Chuah et al. |
| 6,501,767 B1 | 12/2002 | Inoue et al. |
| 6,510,153 B1 | 1/2003 | Inoue et al. |
| 6,546,425 B1 | 4/2003 | Hanson et al. |
| 6,587,680 B1* | 7/2003 | Ala-Laurila et al. ......... 455/411 |
| 6,597,671 B1 | 7/2003 | Ahmadi et al. |
| 6,611,864 B2 | 8/2003 | Putzolu et al. |
| 6,614,774 B1 | 9/2003 | Wang |
| 6,615,267 B1 | 9/2003 | Whalen et al. |
| 6,621,793 B2 | 9/2003 | Widegaren et al. |
| 6,636,502 B1 | 10/2003 | Lager et al. |
| 6,661,780 B2 | 12/2003 | Li |
| 6,694,366 B1 | 2/2004 | Gernert et al. |
| 6,714,515 B1 | 3/2004 | Marchand |
| 6,714,987 B1 | 3/2004 | Amin et al. |
| 6,732,177 B1 | 5/2004 | Roy |
| 6,757,734 B1 | 6/2004 | Resenius et al. |
| 6,763,007 B1* | 7/2004 | La Porta et al. ............ 370/331 |
| 6,769,000 B1 | 7/2004 | Akhtar et al. |
| 6,798,757 B2 | 9/2004 | Mizutari |
| 6,804,720 B1 | 10/2004 | Vilander et al. |
| 6,854,014 B1 | 2/2005 | Amin et al. |
| 6,856,676 B1 | 2/2005 | Pirot et al. |
| 6,904,466 B1* | 6/2005 | Ishiyama et al. ............ 709/245 |
| 7,020,464 B2* | 3/2006 | Bahl et al. ............... 455/432.1 |
| 7,024,480 B2* | 4/2006 | Weik .......................... 709/227 |
| 7,114,083 B2* | 9/2006 | Devine et al. ................ 707/10 |
| 7,197,570 B2* | 3/2007 | Eylon et al. ................. 709/231 |
| 7,372,868 B2* | 5/2008 | Corwin ....................... 370/463 |
| 2001/0009025 A1 | 7/2001 | Ahonen |
| 2001/0040222 A1 | 11/2001 | Yamaguchi et al. |
| 2001/0042201 A1 | 11/2001 | Yamaguchi et al. |
| 2001/0047474 A1 | 11/2001 | Takagi et al. |
| 2001/0052081 A1 | 12/2001 | McKibben et al. |
| 2002/0004900 A1* | 1/2002 | Patel ........................... 713/155 |
| 2002/0066036 A1 | 5/2002 | Makineni et al. |
| 2002/0069278 A1 | 6/2002 | Forsi |
| 2002/0075812 A1 | 6/2002 | Corwin |
| 2002/0091855 A1 | 7/2002 | Yemini et al. |
| 2002/0093956 A1 | 7/2002 | Gurin |
| 2002/0098840 A1 | 7/2002 | Hanson et al. |
| 2002/0122394 A1 | 9/2002 | Whitmore et al. |
| 2002/0147843 A1 | 10/2002 | Rao |
| 2002/0167922 A1 | 11/2002 | Inoue et al. |
| 2002/0176383 A1 | 11/2002 | Inoue et al. |
| 2003/0017845 A1 | 1/2003 | Doviak et al. |
| 2003/0028612 A1 | 2/2003 | Lin et al. |
| 2003/0061384 A1 | 3/2003 | Nakatani |
| 2003/0120811 A1 | 6/2003 | Hanson et al. |
| 2003/0163567 A1 | 8/2003 | McMorris et al. |
| 2003/0191848 A1 | 10/2003 | Hesselink et al. |
| 2003/0223439 A1 | 12/2003 | O'Neill |
| 2003/0228874 A1 | 12/2003 | Mallette |
| 2004/0202128 A1 | 10/2004 | Hovmark et al. |
| 2005/0159173 A1 | 7/2005 | Dowling |
| 2005/0260996 A1 | 11/2005 | Groenendaal |
| 2006/0168210 A1* | 7/2006 | Ahonen et al. ............... 709/225 |

FOREIGN PATENT DOCUMENTS

| | | |
|---|---|---|
| EP | 0 998 094 A2 | 5/2000 |
| EP | 1089495 | 4/2001 |
| EP | 1150521 | 10/2001 |
| WO | WO 0033189 | 6/2000 |
| WO | WO 0128185 | 4/2001 |
| WO | WO 0131472 | 5/2001 |
| WO | WO 02/19636 | 3/2002 |
| WO | WO 0223362 | 3/2002 |
| WO | WO 03/061188 | 7/2003 |

OTHER PUBLICATIONS

INTERNETWEEK.com, "Wireless Works, Netmotion makes the difference in wireless networks," Internetweek, 'Online!, XP 002324101 (May 7, 2001).

Yongguang Zhang et al: "A 'Persistent connection' Model for Mobile and Distributed Systems," Computer Communications and Networks, 1995. Proceedings, Fourth International Conference on Las Vegas, NV, USA Sep. 20-23, 1995, IEEE Comput. Soc, US, XP 010200337 (Sep. 20, 1995).

"ETSI TS 123 060, V3.3.0, Digital cellular telecommunications system (Phase 2+)(GSM); Universal Mobile Telecommunications System (UMTS); General Packet Radio Service (GPRS); Service description; Stage 2 (3G TS 23.060 version 3.3.0 Release 1999)," pp. 1-186 (Apr. 2000).

"3G TS 23.171, V3.1.0, $3^{rd}$ Generation Partnership Project; Technical Specification Group Services and System Aspects; Functional stage 2 description of location services in UMTS (Release 1999)," pp. 1-48, XP002269105 (Jul. 2000).

Johnson, D.B., "Mobility Support in IPv6," Internet Draft, IETF Mobile IP Working Group, XP-002951077 (Jul. 2, 2000).

Mink, S. et al., "Towards Secure Mobility Support for IP Networks," IEEE Publication, vol. 1, pp. 555-562, SP101526810 (Aug. 21, 2000).

Product Information, PadCom, Inc, PadCom Connectivity Suite, "Connectivity Suite Technical Overview".(2001, 2002).

Harkins, et al., "The Internet Key Exchange (IKE)", Networking Working Group RFC 2409 (Nov. 1998).

Housley, et al., "Internet X.509 Public Key Infrastructure Certificate and CRL Profile," Networking Working Group RFC 2459 (Jan. 1999).

Atkinson, "IP Encapsulating Security Payload (ESP)," Networking Working Group RFC 1827 (Aug. 1995).

Atkinson, "IP Authentication Header," Networking Working Group RFC 1826 (Aug. 1995).

Atkinson, "Security Architecture for the Internet Protocol," Networking Working Group RFC 1825 (Aug. 1995).

Perkins, "IP Mobility Support," Network Working Group RFC 2002 (Oct. 1996).

Perkins, "IP Mobility Support for the IPv4," RFC 3220 (Jan. 2002).

ANSI/IEEE Std. 802.11, 1999 Edition, Part 11: Wireless LAN Medium Access Control (MAC) and Physical Layer (PHY) Specifications.
Weber, Chris, "Using IPSec in Windows 2000 and XP, Part One," http://www.securityfocus.com/infocus/1519 (Dec. 5, 2001).
Robbins, John, "Bugslayer", MSJ, Feb. 1998, http://www.microsoft.com/msj/0298/bugslayer0298.htm (Feb. 1998).
Robbins, John, "Bugslayer", MSJ, Jun. 1999, http://www.microsoft.com/msj/0699/BugSlayer/Bugslayer0699.htm (Jun. 1999).
Richter, Jeffrey, "Programming Applications for Microsoft Windows", Fourth Edition, Chapter 22, Microsoft Press, (1999).
Nasarre, Christophe, "Debug Detect and Plug GDI Leaks in Your Code with Two Powerful Tools for Windows XP," MSDN Magazine, (Jan. 2003).
Savarese, Joe, "Security standards improve," reprinted from Communications News (Jan. 2002).
"Viatores Mobile VPN, Technical Overview," pp. 1-19, Ecutel, Inc., Alexandria, VA (Aug. 2001).
3GPP SA: "Technical Specification Group Services and Systems Aspects: Architecture for an 1 IP Network, 3GPP TR 23.922", 3GPP Standard, Oct. 1, 1999, XP002144276.
3GPP: "TR23 923 V3.0.0: Combined GSM and Mobility Handling in UMTS IP CN", May 2000, pp. 1-75 XP002282368.
ETSI: "3G TS 23.107 Universal Mobile Telecommunications System (UMTS) QoS Concept and Architecture", ETSI TS 123 107 V.3.3.0, Jun. 2000, pp. 1-36, XP002201573.
"How WRQ's TCP Connection Reduces Costs and Improves Reliability in Mobile/Wireless Computing" (WRQ Jan. 1995).
"Questions and Answers for TCP/IP for CDPD Wireless Communications" (WRQ Nov. 1994).
"TCP Connection stacks up as #1 in InfoWorld Comparison." WRQ Quarterly No. 30 Quarter 4 (1994).
"WRQ's Reflection Network Series Supports New Wireless Mobile Computing: McCaw Dubs WRQ's TCP Well-Suited for Cellular," McCaw chooses WRQ's TCP Connection: calls Reflection "well-suited for cellular" (WRQ Oct. 11, 1994 Press Release).
Ala-Laurila, Juha, et al., "Implementation of the wireless ATM access terminal," Computer Networks 31, pp. 959-973 (1999).
Alanko, T., et al., "Mobile computing based on GSM: The Mowgli approach," IFIP '96 World Conference—Mobile Communications, Canberra, Australia (Sep. 2-6, 1996).
Almquist, P. RFC 1716 "Towards Requirements for IP Routers" (IETF Nov. 1994).
Almquist, P., "Ruminations on Next-Hop" (Mar. 25, 1993).
Anderson, T.E., et al., "Serverless Network File Systems," ACM Transactions on Computer Systems, vol. 14, No. 1, pp. 41-79 (Feb. 1996).
B. Tuch, Development of WaveLAN, an ISM band wireless LAN, Lucent Technical Journal, 27-37 (Jul./Aug. 1993).
Baker, F. RFC 1812 "Requirements for IP Version 4 Routers" (IETF Jun. 1995).
Balakrishnan, Hari, et al., XP-000734405, "A Comparison of Mechanisms for Improving TCP Performance over Wireless Links," IEEE/ACM Transactions on Networking, vol. 5, No. 5,(Aug. 1996).
Bordan, Jonathan, Power Point Presentation "Wireless WAN Extensions to NDIS Mobitex NDIS driver" (Ericsson Communications Canada Connectivity Lab (Jul. 17, 1996).
Braden, R., RFC 1009 "Requirements for Internet Gateways" (IETF Jun. 1987).
Braden, R., RFC 1123, "Requirements for Internet Hosts—Application and Support" (Oct. 1989).
Brodsky, Ira, "PDAs will usher in the next net revolution," Special Focus, Wireless Networks, Network World (Nov. 7, 1994).
Cáceres, R., et al., "Improving the Performance of Reliable Transport Protocols in Mobile Computing Environments".
Caporuscio, Maurio, et al., "Design and Evaluation of a Support Service for Mobile, Wireless Publish/Subscribe Applications," IEEE Transactions on Software Engineering, vol. 29, No. 12, pp. 1059-1071 (Dec. 2003).
Castineyra, I., RFC 1992, "The Nimrod Routing Architecture" (IETF Aug. 1996).
Cerf, V., RFC 829, "Packet Satellite Technology Reference Sources" (Nov. 1982).
DTMF—Common Information Model (CIM), http://www.dmtf.org/standards/cim/.
Durham, D., et al., Networking Group Request for Comments 2748, The COPS (Common Open Policy Service) Protocol.
Dynamic Host Configuration Protocol, RFC 2131 (IETF Mar. 1997), http://people.nokia.net/charliep/.
Inouye, Jon et al., "Dynamic Network Reconfiguration Support for Mobile Computers," MOBICOM 97 Budapest Hungary, pp. 13-22 (1997).
Internet Draft Piscitello, D., Phifer, L. Core Competence, Wang, Y., Hovey, R. Bellcore: "Mobile Network Computing Protocol (MNCP)," Sep. 3, 1997.
Internet Mobility 4x4, Cheshire, S. & Baker, M., SIGCOMM '96, Computer Science Dept., Stanford Univ., AC< ISBN: 0-201-37928-7, p. 1-12.
IP Mobility Support (RFC 2002, IETF Oct. 1996).
Jacobson, V. et al., Networking Working Group Request for Comments: 1072, "TCP extensions for long-delay paths" (Oct. 1988).
Jacobson, V., et al., "Congestion Avoidance and Control" (Nov. 1988).
Jacobson, V., Networking Working Group Request for Comments: 1144, "Compressing TCP/IP headers for low-speed serial links" (Feb. 1990).
Jaeger, Trent, et al., "A Role-based Access Control Model for Protection Domain Derivation and Management," RBAC97 Fairfax Va USA (1997).
Katz, "Transmission of IP and ARP over FDDI Networks" (Internet Draft Sep. 14, 1992).
Katz, D., Network Working Group Internet Draft, "Transmission of IP and ARP over FDDI Networks," (Sep. 14, 1992).
Katz, R.H., et al., The Bay Area Research Wireless Access Network (BARWAN).
Kei, Lee Man, et al., "An Efficient RPC Scheme in Mobile CORBA Environment," IEEE (2000).
Kleinrock, Leonard, Nomadix, Inc., "On Some Principles of Nomadic Computing and Multi-Access Communications," IEEE Communications Magazine, pp. 46-50 (Jul. 2000).
Kobielus, James, "Prospects are golden for Wireless Data Services," Special Focus, Wireless Networks, Network World (Nov. 7, 1994).
mailing list at http://www.citi.umich.edu/projects/mobile/mobile-ip-mail (Jun. 1992-Jul. 1995).
Martin, Jean-Christophe, "Policy-Based Networks," XP-002271561, Sun BluePrints OnLine (Oct. 1999).
Mathias, Craig et al., "The ABCs of PCS," Special Focus, Wireless Networks, Network World (Nov. 7, 1994).
Medhi, D., et al., "Network Dimensioning and Performance of Multiservice, Multirate Loss Networks with Dynamic Routing," IEEE/ACM Transactions on Networking, vol. 5, No. 6, pp. 944-957 (Dec. 1997).
Ohta, "Conventional IP over ATM" (Internet Draft Mar. 1995).
Ohta, M. et al., Internet Draft draft-ohta-ip-over-atm-02.txt, Conventional IP over ATM (Mar. 1995.
Other papers authored by Charles Perkins posted at http://people.nokia.net/charliep/.
PCA STD-201 Extensions to NDIS for Wireless WANs, Official Standard, Appendices A-F, (Mar. 18, 1997).
PCCA STD 201, Extensions to NDIS for Wireless WANs, Revision 1.1 (Oct. 29, 1996).
PCCA STD-201 "Extensions to NDIS for Wireless WANs" Version 1.1 (Jul. 7, 2000).
PCCA-STD-201, Extensions to NDIS for Wireless WANs, Revision 1.1 (May 9, 1997).
PCCA-XSTD-201, Extensions to NDIS 3 for Wireless WANs, Draft Version 0.09 (Aug. 31, 1995).
PCCA-XSTD-201, Extensions to NDIS 3 for Wireless WANs, Version 1.1 (Jan. 3, 1996).
PCCA-XSTD-201, Extensions to NDIS 3 for Wireless WANs, Version 1.2 (Jan. 17, 1996).
PCCA-XSTD-201, Extensions to NDIS 3 for Wireless WANs, Version 1.0 (Oct. 25, 1995).
PCCA-XSTD-201, Wireless Extensions to NDIS 3 Proposal, Draft Version 0.08 (Jul. 5, 1995).

PCCA-XWPDS, Draft Proposed PCCA Standard, "PCCA Extensions for the PC/TCP Packet Driver Specification," Revision 1.03a (Dec. 11, 1994).
Perkins et al, DHCP for IPv6, The Third IEEE Symposium on Computers and Communications (ISCC'98) Athens, Greece Jun. 30-Jul. 2, 1998.
Perkins et al., DHCP for Mobile Networking with TCP/IP (ISCC 1995), http://people.nokia.net/charliep/.
Perkins et al., "Using DHCP with Computers that Move" (Wireless Networking 1993), http://people.nokia.net/charliep/.
Perkins, C., RFC 2003, "IP Encapsulation within IP," (IETF Oct. 1996).
Perkins, Internet Draft: "IP Mobility Support" (IETF May 31, 1996).
Piscitello, D., *Internet Draft*, "Mobile Network Computing Protocol (MNCP)," 55 pages (Aug. 28, 1997).
Portable Computer and Communications Association (PCCA) "Extensions to NDIS for Wireless WANs" (Version 1.0 1996).
Power Point Presentation "Advantages of WRQ's TCP" (WRQ 1994).
Press Release, "Bethlehem, Penn.—(Business Wire) via Individual Inc.—Designed for businesses with mobile workers, PADCOM, Inc. today introduced SmartPath . . . " (Sep. 22, 1997).
Published Internet Standards: Request for Comment No. 1122, "Requirements for Internet Hosts—Communications Layers" (IETF Oct. 1989).
Ramanathan, "Nimrod Mobility Support" (Internet Draft Jul. 1994).
Ranch, "Transmitting IP Traffic over LocalTalk Networks" (Internet Draft Jul. 1992).
Request for Comment (RFC) 1674 "A Cellular Industry View of IPng" (IETF Aug. 1994).
Sharer, R.J., "Applying Policy Management to Reduce Support Costs for Remote and Mobile Computing," International Journal of Network Management, 8, 211-218 (1998).
Solomon, Internet Draft, "Mobile IP Working Group," (May 24, 1996).
Stevenson, H., et al., Network Working Group Internet Draft, "A Method for the Transmission of IP Datagrams Over SNA Networks Using LU6.2 Conversations" (May 11, 1992).
Technical Report, 3G TR 23.923 V.3.0.0, XP-002282368, 3rd Generation Partnership Project; Technical Specification Group Services and System Aspects; Combined GSM and Mobile IP Mobility Handling in UMTS IP CN (May 2000).
Technical Report, 3GPP TR 23.922 V1.0.0 (1999-10) XP-002144276, 3rd Generation Partnership Project, Technical Specification Group Services and Systems Aspects; Architecture for an All IP network.
Technical Specification, ETSI TS 123 107 V3.3.0 (2000-06), XP-002201573, Universal Mobile Telecommunication System (UMTS); QoS Concept and Architecture (Release 1999).
The UC Berkeley BARWAN Research Project CDROM, with Index, http://daedalus.cs.berkeley.edu/.
Valko, A., et al., XP-002133539, Internet Draft, "Cellular IP" (Nov. 18, 1998).
Westerinen, A., et al., Networking Group Request for Comments 3198, "Terminology for Policy-Based Management," 13 pages (Nov. 2001).
White Paper, "TCP/IP: The Best Protocol for Remote Computing," www.rysavy.com/Articles/remote.htm, (1996).
Wright, Michele, XP-002116275, "Using Policies for Effective Network Management," International Journal of Network Management, 9, 118-125 (1999).
WRQ Reflection Network Series TCP Connection Version 4 (1994).
www.geckil.com search engine results using, for example, search terms "DHCP" and "Mobility".
www.ka9q.net/code/ka9qnos/ (last updated Mar. 15, 2002).
Wong, Daniel, "Soft Handoffs in CDMA Mobile Systems," IEEE Personal Communications, Dec. 1997.
"KeyWareTM—A Wireless Distributed Computing Environment", Racotek White Paper, Racotek, Inc., Minneapolis, MN, 1995.
"Mavric 2000: Integrated Data and Voice Communications System", Mavric 2000 Performance Specifications Brochure, Metric Systems Corp., Acton, MA, 1991.
"RacoNet: Mobile Data Communication Services Product Catalog," Rev. 1.03, Racotek, Inc., Minneapolis, MN, 1993.
"Racotek: Design Considerations for Mobile Data Applications", Racotek 400-0054-00, Racotek, Inc., Minneapolis, MN, Jan. 1993.
"RacoNet: Mobile Data Communications Services Price List", Rev. 1.03, Racotek, Inc., Minneapolis, MN, 1993.
"MPS II System Component: Mobile System Printer", Racotek Sales Brochure, Racotek, Inc., Minneapolis, MN, Feb. 1990.
"MPS II System Component: Mobile System Data Terminal", Racotek Sales Brochure, Racotek, Inc., Minneapolis, MN, Feb. 1990.
"MPS II Component: Adaptive Network Modem", Racotek Sales Brochure, Racotek, Inc., Minneapolis, MN, Feb. 1990.
"Racotek Overview", Racotek, Inc., Minneapolis, MN, 1993.
"Unify Your Mobile Data Communications with RacoNet", Racotek Sales Brochure, Racotek, Inc., Minneapolis, MN, 1992.
"The Race is Won by the Fleet", Racotek Sales Brochure, Racotek, Inc., Minneapolis, MN, publication date unknown.
Datalines, vol. 5, No. 2, Racotek, Inc., Minneapolis, MN, Apr. 1993.
Datalines, vol. 5, No. 3, Racotek, Inc., Minneapolis, MN, Sep. 1993.
Datalines, vol. 6, No. 1, Racotek, Inc., Minneapolis, MN, Feb. 1994.
"Racotek/HDC: Operations Booklet for Mobile Data Terminals", Racotek, Inc., Minneapolis, MN, 1993.
Shpancer et al., "Open Data-On-Voice Systems for SMRs", Racotek—Radio Computer Technologies, presented at NABER's 1990 Annual Meeting, May 9-12, Tampa, FL, 1990.
"How to Hold Together a Business that Heads Off in Every Direction", RaCoNet Networking Software, Racotek Sales Brochure, Racotek, Inc., Minneapolis, MN, publication date unknown.
Robert J. Fraser, "The MTS-Part II", Communications, pp. 52-55, Aug. 1991.
"Wireless Data Communications and RAM Mobile Data", RAM Mobile Data Sales Brochure, RAM Mobile Data U.S.A., 1992.
"RAM Mobile Data: Field Service", RAM Mobile Data Sales Brochure, RAM Mobile Data U.S.A., 1992.
"Market Opportunities for System Integrators, Mobile Data Terminal Manufacturers, Radio and Modem Manufacturers, and Software Developers", RAM Mobile Data Sales Brochure, RAM Mobile Data U.S.A., publication date unknown.
On the Air, a quarterly publication of ARDIS, Lincolnshire, IL, vol. 3, Spring 1993.
On the Air, a quarterly publication of ARDIS, Lincolnshire, IL, vol. 4, Jul. 1993.
On the Air, a quarterly publication of ARDIS, Lincolnshire, IL, vol. 5, Fall 1993.
Robert B. Euler, "Making the Mobile Communications Connection", MSM Magazine, Jun. 1990.
"ARDIS Marks First Birthday of Network Operation", ARDIS News Release, ARDIS, Lincolnshire, IL, Apr. 1991.
"ARDIS Extends its Reach into Canada", ARDIS News Release, ARDIS, Lincolnshire, IL, Feb. 1992.
"ARDIS Focuses on Sales Force Automation", ARDIS News Release, ARDIS, Lincolnshire, IL, Oct. 1993.
"ARDIS Sets the Standard for Wireless Data Communications", ARDIS News Release, ARDIS, Lincolnshire, IL, publication date unknown.
"How Does One Overnight Delivery Service Guarantee Overnight Success?", ARDIS Sales Advertisement, ARDIS, Lincolnshire, IL, publication unknown.
"ServiceXpress", ARDIS Sales Brochure, ARDIS, Lincolnshire, IL, publication date unknown.
"ARDIS is the First Radio Frequency Network for the Motorola Envoy Wireless Personal Communicator", Communication by ARDIS, ARDIS Sales Brochure, ARDIS, Lincolnshire, IL, publication date unknown.
"ARDIS", Company Profile Brochure, ARDIS, Lincolnshire, IL, publication date unknown.
"ARDISmailSM 100: The Wireless E-Mail Package", ARDIS Sales Brochure, ARDIS, Lincolnshire, IL, publication date unknown.
"Congratulations. You Have the Sale!", ARDIS Sales Brochure, ARDIS, Lincolnshire, IL, publication date unknown.
"Wireless Solutions Can Mean the Difference . . . ", ARDIS Sales Brochure, ARDIS, Lincolnshire, IL, publication date unknown.

"Achieving the Highest Level of Productivity with New Thinking and a New Vision", ARDIS Sales Brochure, ARDIS, Lincolnshire, IL, publication date unknown.

Form S-1 Registration Statement of Racotek Inc. (with exhibits), as filed with the Securities and Exchange Commission on Oct. 22, 1993. Amendment No. 1 to Form S-1 Registration Statement of Racotek Inc., as filed with the Securities and Exchange Commission on Nov. 4, 1993.

Ericsson GE, "Mobile Data System Evolution", publication date unknown.

Ericsson GE, "Mobile Data Questions & Answers", dated Mar. 3, 1994.

Ericsson GE, "Private Radio Systems EDACS.RTM. Data Advantage.TM. Technical Description", publication date unknown.

Motorola, Inc., "Integrated Voice and Data System Description", publication date unknown.

Motorola, Inc., "VRM-100 Vehicular Radio Modem", publication date unknown.

Motorola Private Systems Division Land Mobile Products Sector, "VRM 100 Vehicular Radio Modem for Integrated Voice; and Data Operation on Smartnet and SmartZone Trunked Radio Systems and Conventional Radio Systems—Product Description", Apr. 5, 1994.

Motorola Mobile Data Division, "RPM Native Mode Interface R1.1 Reference Manual", published Sep. 1992.

English Language Abstract of JP 63-224422.

English Language Abstract of JP 3-32125.

Hills, Alex et al., "Seemless Access to Multiple Wireless Data Networks: A Wireless Data Network Infrastructure at Carnegie Mellon University", IEEE Personal CommunicationsMagazine, 3(1):56-63, Feb. 1996.

Johnson, David B., "Scalable Support for Transparent Mobile Host Internetworking", Wireless Networks, vol. 1, No. 3, pp. 311-321 (1995).

Johnson, David B., "Scalable and Robust Internetwork Routing for Mobile Hosts", 14th International Conference on Distrbuted Computing Systems, Jun. 21-24, 1994, Pozman, Poland.

Johnson, David B., "Ubiquitous Mobile Host Internetworking", Proceedings of the Fourth Workshop on Workstation Operating Systems, IEEE Computer Society, Oct. 1993.

Perkins, Charles et al., "IMHP: A Mobile Host Protocol for the Internet", Computer Networks and ISDN Systems, vol. 27, No. 3, pp. 479-491 (1994).

Johnson, David B., "Mobile Host Internetworking Using IP Loose Source Routing", Carnegie Mellon University, School of Computer Science (1993).

Perkins, Charles et al., "Mobility Support in IPv6", Proceedings of the Second Annual International Conference on Mobile Computing and Networking (MobiCom '96), Nov. 10-12, 1996.

Solomon, J., "Applicability Statement for IP Mobility Support", The Internet Engineering Taskforce, RFC 2005, Oct. 1996.

Thyfault, M., "Wireless has a Support Act—Carriers at Comdex Tout Applications for Cellular Digital Packet Data," Information Week (1993). Available from Dialog Corporation.

Wexler, J., "CDPD Spec Could Embrace Analog Nets," Network World vol. 12, No. 13 (Mar. 1995): pp. 17, 24. Available from Dialog Corporation.

"Hybrid Cellular Data Technology in Works," Telecommunications Alert vol. 12, No. 222 (Nov. 1995). Available from Lexis.

Schwartz, J., "GTE Mobilnet Retrofits CDPD Network to Connect with Analog Cellular," Communications Week (1996): p. 53. Available from Dialog Corporation.

"GTE Closer to Installing Circuit Switched-CDPD Gateway;Plans to Offer National 'CDPD Access'via '800' Number Service," Wireless Data News, vol. 4, Issue 6 (Mar. 1996). Available from Dialog Corporation.

Washburn, B., "CDPD: The Tower of Power," America's Network (Aug. 1996): p. 42. Available from Lexis.

Steward, S., "A circuitous Route to CDPD Expansion; Cellular Digital Packet Data," Cellular Business vol. 13, No. 9 (Sep. 1996): p. 102. Available from Lexis.

"Sierra Wireless Adds CS-CDPD," Business Wire (Jan. 1997), Available from World Wide Web: (http://www.sierrawireless.com/news/cdpd.html), downloaded Mar. 12, 2002.

Sukow, R., "GTE Wireless's CS-CDPD Technology Will Be Commercially Available Feb. 3" Communications Today (Jan. 1997). Available from Dialog Corporation.

"Wireless: GTE, Hughes Network Systems and PCSI Join to Provide Nationwide Wireless Access for 'Super Phones,' Other Intelligent Devices," Edge, on & about AT&T (Feb. 1997). Available from Dialog Corporation.

Pate, K.,"CS-CDPD May Solve Wireless Data User Problem with Coverage (Circuit Switched-Cellular Digital Packet Data Is Launched to Allow Data Users to Access CDPD Functionality Across an Entire Network)," RCR Radio Communications Report vol. 16, No. 5 (Feb. 1997):p. 2. Available from Dialog Corporation.

"GTE Wireless Launches Long-Anticipated CS-CDPD Service; Other Cellular Carriers Continue to Reject Hybrid Approach," Wireless Data News, vol. 5, Issue 3 (Feb. 1997). Available from Dialog Corporation.

"Industry News: CS-CDPD Goes Nationwide," Advanced Transportation Industry Review. (May 1997). Available from Dialog Corporation.

"Dueling Realities: Cellular Data Developers Struggle to Build Business, Yet Foresee Future Consumer, Ad-Supported Market," Wireless Data News, vol. 5, Issue 11 (May 1997). Available from Dialog Corporation.

"GTE Wireless Offers National Access for 'Super Phones'," Cellular Business (Jun. 1997). Available from Dialog Corporation.

Morris, J., "Guide to Wireless Data Networks," Sierra Wireless, (Jul. 1997), available on the World Wide Web: (http://www.ofb.net/heath/ardis/2110152.pdf).

"GTE, Sierra Announce CDPD Solution (GTE Wireless and Sierra Wireless Introduced a Circuit Switched Cellular Digital Packet Data Solution)," RCR Radio Communications Report (Jun. 1998):p. 8. Available from Dialog Corporation.

"GTE, Sierra Wireless Bring Circuit-Switched CDPD to Indiana Law Enforcement," Wireless Data News, vol. 6, Issue 15 (Jul. 1998). Available from Dialog Corporation.

"Sierra Modem Adds Coverage (Indiana State Police Department is the First in US to Use New Circuit-Switched CDPD Modem from Sierra Wireless," Wireless Week (Jul. 1998):p. 14. Available from Dialog Corporation.

"GTE and Sierra Wireless Extend Reach of Cellular Digital Packet Data Networks Nationwide," Available from World Wide Web: (http://www.sierrawireless.com/news/gte&swi.html), downloaded Mar. 12, 2002.

"MP215: The First Ever CS-CDPD 3W Modem. (End-to-end wireless IP anywhere—Automatically)," Tri-M Systems, Coquitlam, B.C., Canada.

"CS-CDPD," Available from World Wide Web: (http://www.sierrawireless.com/alliance/nettech_cscdpd.asp.), downloaded Mar. 12, 2002.

"Circuit Switch Cellular Digital Packet Data," Available from World Wide Web: http://www.leapforum.org/published/internetworkMobility/split/node91. html), downloaded Mar. 18, 2002.

"MP215 Modem Installation,Configurarion, and User's Guide,"Revision 1.0, Part No. 2110036, Sierra Wireless, Jun. 1998.

"Where There's Voice, There's Now Cost-effective Data with Lucent Technologies' New Circuit Switched CDPD Capability," Lucent Technologies, Jun. 1996.

Hunt, Craig, "TCP/IP Network Administration" O'Reilly & Associates, Inc., pp. 28-35 (1992).

Chen, J.B. et al., "MOSS: A Mobile Operating System Substrate", Harvard University Division of Applied Sciences, May 1995.

Baker, M., "Changing Communication Environments in MosquitoNet," Proceedings of the IEEE Workshop on Mobile Computing Systems and Applications, Dec. 1994.

Cheshire, S. et al., "Experiences with a Wireless Network in MosquitoNet", Proceedings of the IEEE Hot Interconnects Symposium '95, Aug. 1995.

Zhao, X. et al., "Flexible Network Support for Mobility," Proceedings of the Fourth Annual ACM/IEEE International Conference on Mobile Computing and Networking (MobiCom 1998), Dallas Texas, Oct. 1998.

Baker, M. et al., "Supporting Mobility in MosquitoNet," Proceedings of the 1996 USENIX Technical Conference, San Diego, California, Jan. 1996.

Alzona, M., et al., "Project Octopus, A Framework for Ubiquitous Mobile Computing", Technical Report 1994-96, Carnegie Mellon University Information Network Institute, Sep. 17, 1994.

Bruegge, B., et al., "Applications of Mobile Computing and Communications", IEEE Personal Communications Magazine, 3(1):64-71, Feb. 1996.

Johnson, D., et al., "Truly seamless wireless and mobile host networking, Protocols for adaptive wireless and mobile networking", IEEE Personal Communications Magazine, 3(1):34-42, Feb. 1996.

Katz, R., et al., "The Case for Wireless Overlay Networks", Proceedings of SPIE Conference on Multimedia and Networking vol. 2667, Mar. 1996.

Stemm, M., "Vertical Handoffs in Wireless Overlay Networks", Technical Report CSD-96-903, University of California, Berkeley, May 1996.

Caceres, R., et al., "Fast and Scalable Handoffs for Wireless Internets", Proceedings of the Second Annual International Conference on Mobile Computing and Networking, Nov. 1996.

Columbitech Wireless VPN(TM) Technical Description (Updated Oct. 22, 2007).

* cited by examiner

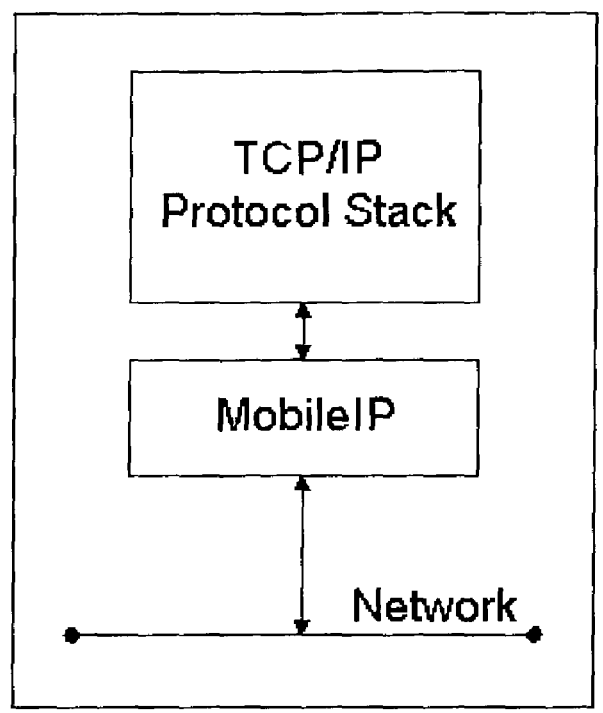
Figure 1 – Example Mobile IP Client Architecture (Prior Art)

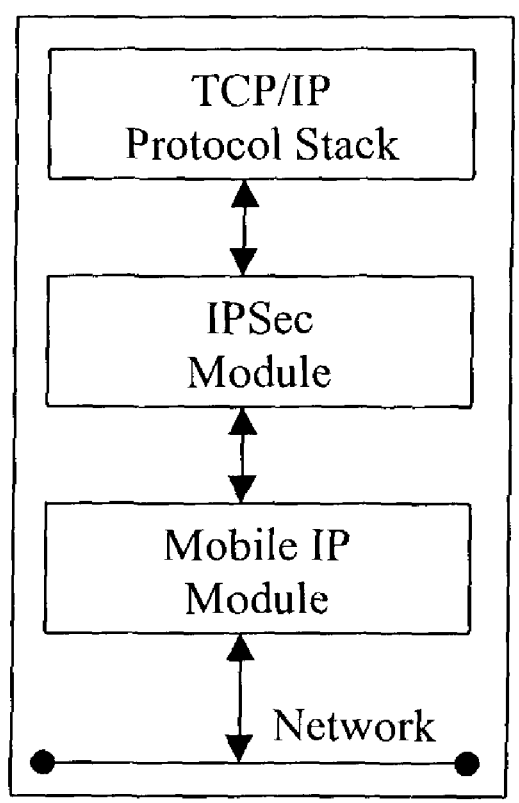
Figure 2: Example IPSec and Mobile IP Architecture (Prior Art)

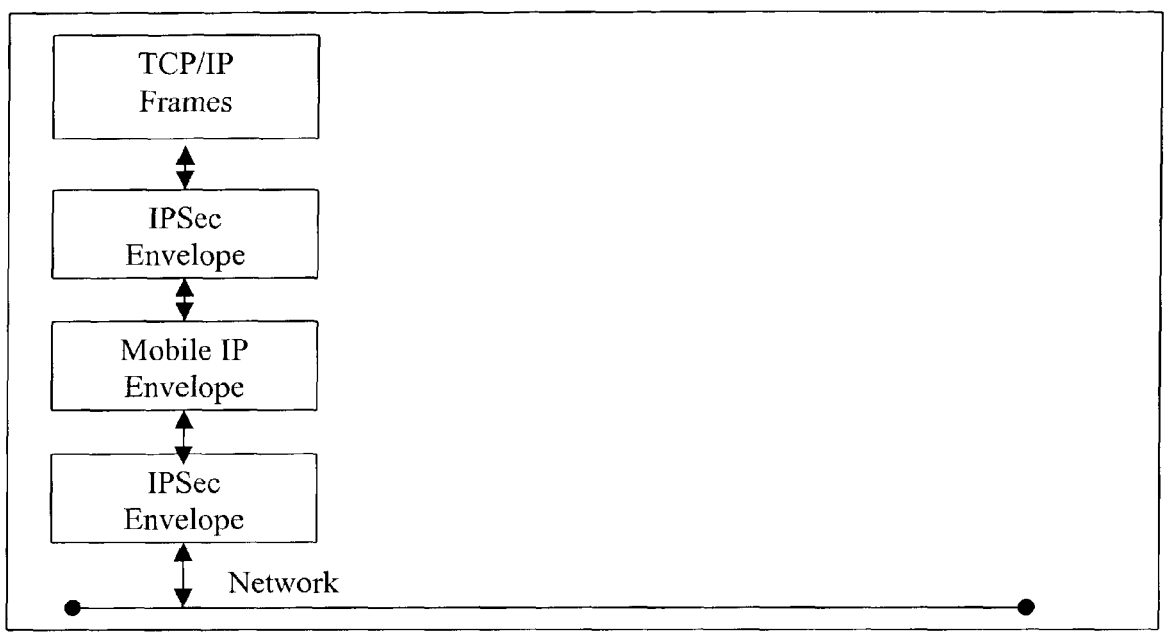
Figure 3: Enabling Roaming With Mobile IP And IPSec Encapsulation

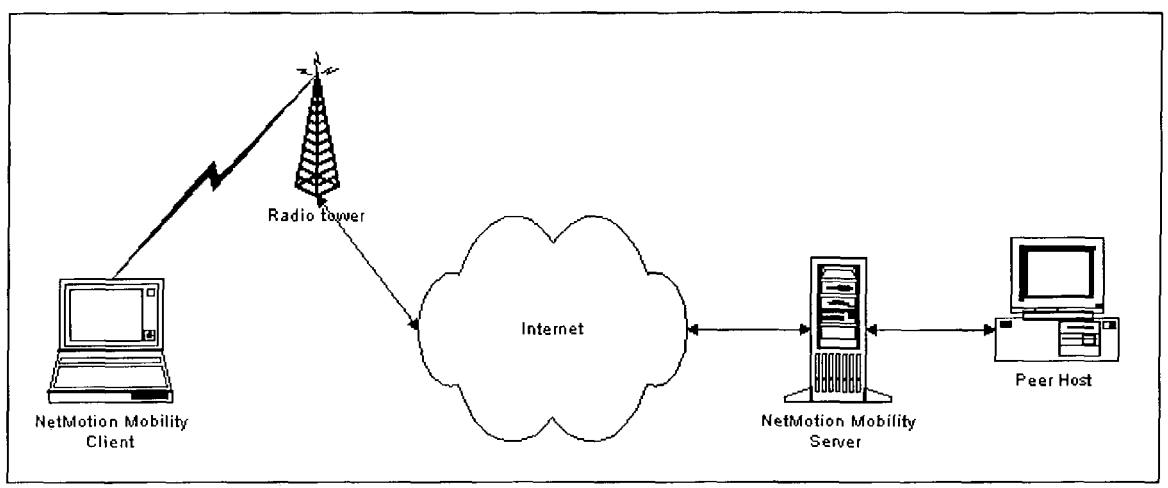
Figure 4 – Example Non-Limiting Secure Mobility Architecture

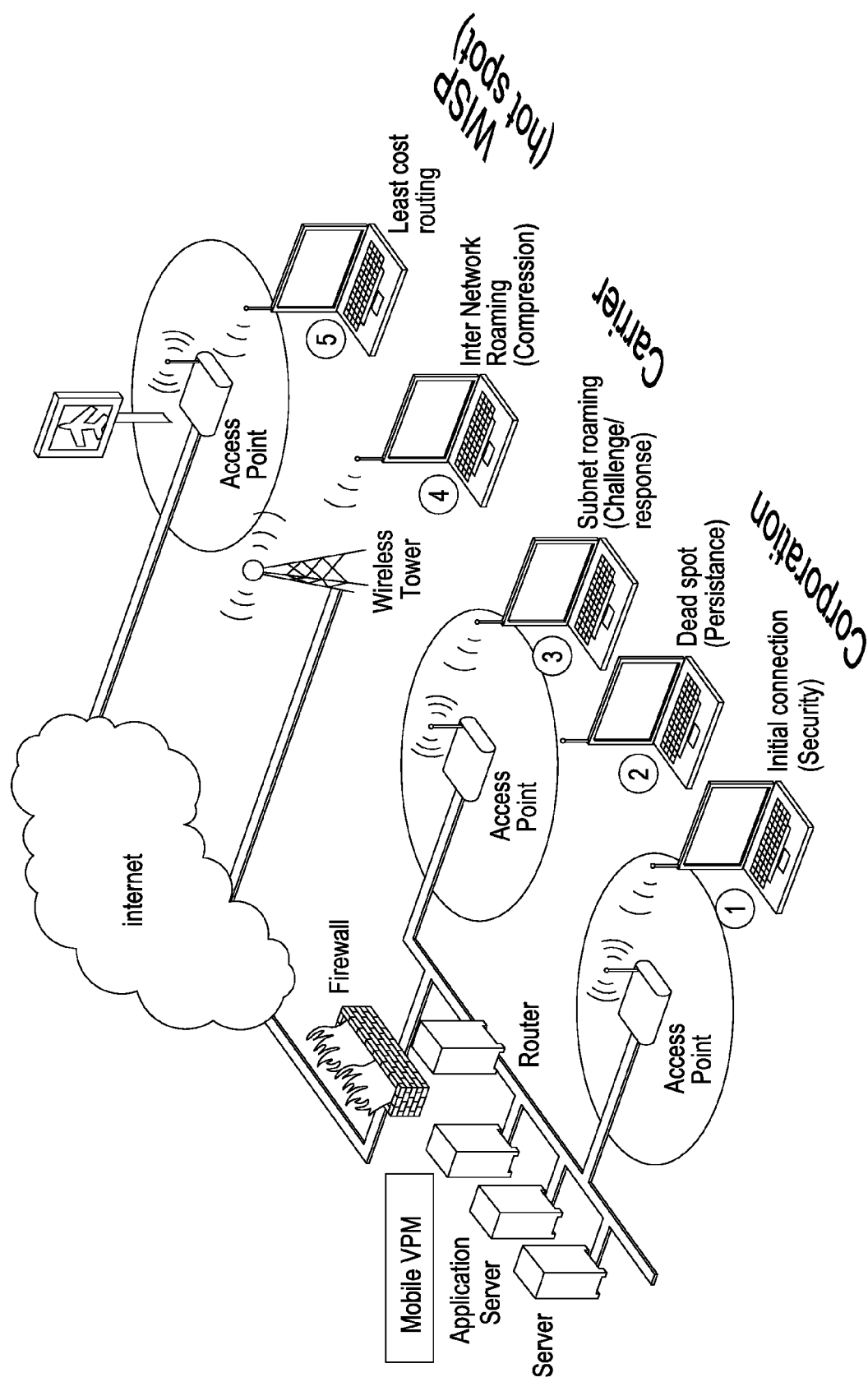
Figure 5 - Example Non-Limiting Illustrative Mobile Usage Scenarios

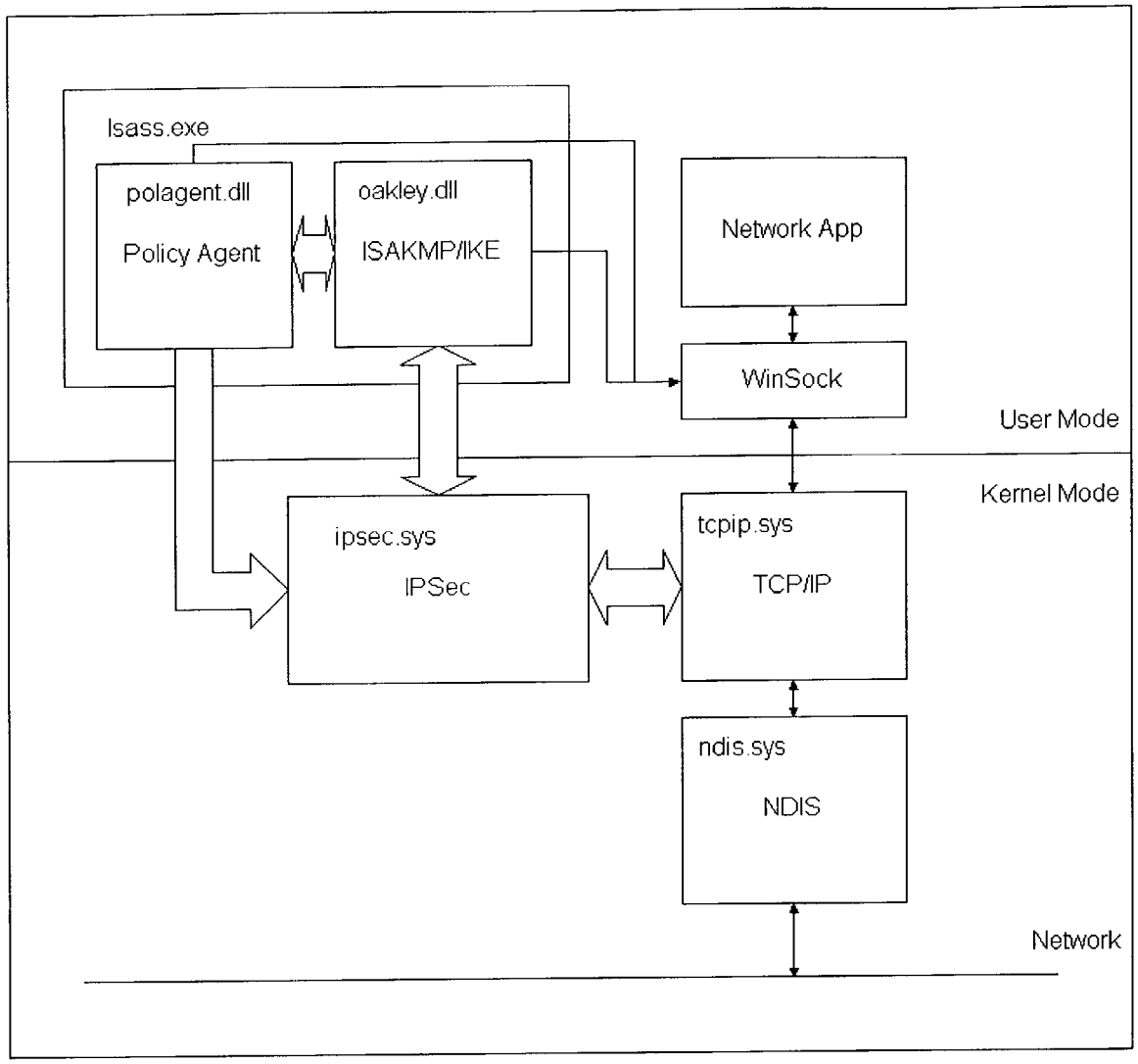
Figure 6 – Example IPSec Operating System Security Architecture
(Prior Art)

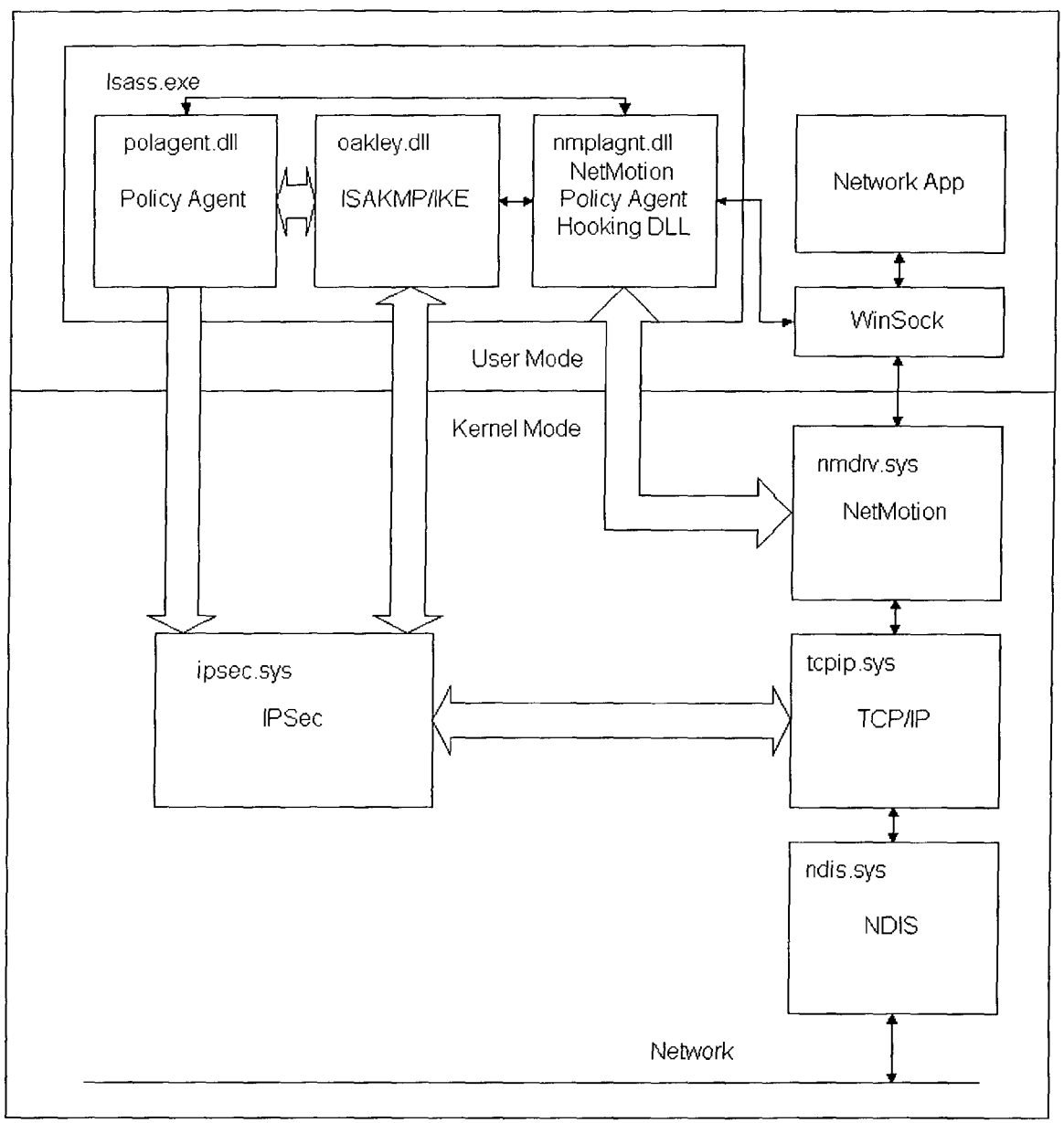
Figure 7 – Example Client Architecture

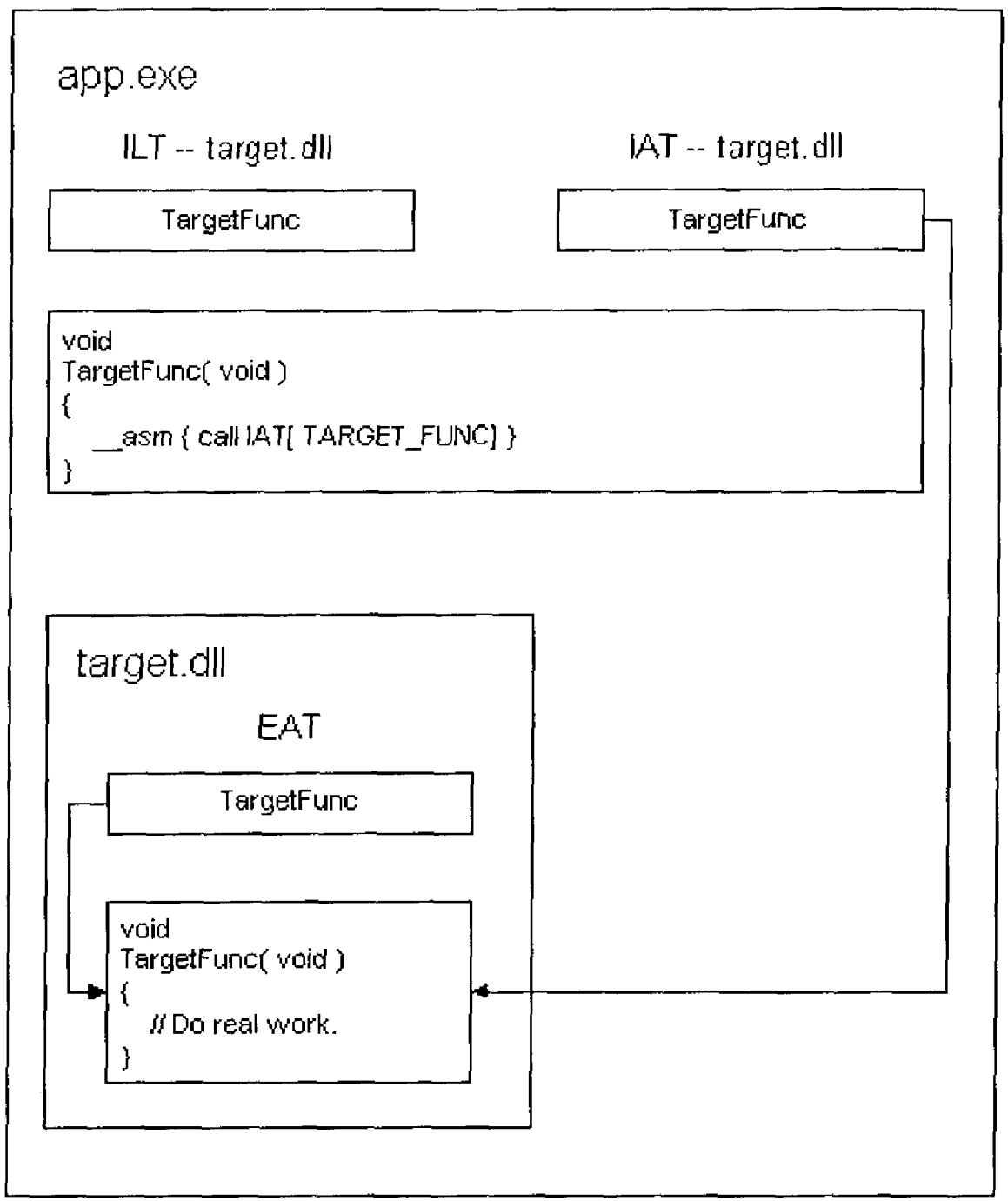
Figure 8 – Example Run-time Linking Sample

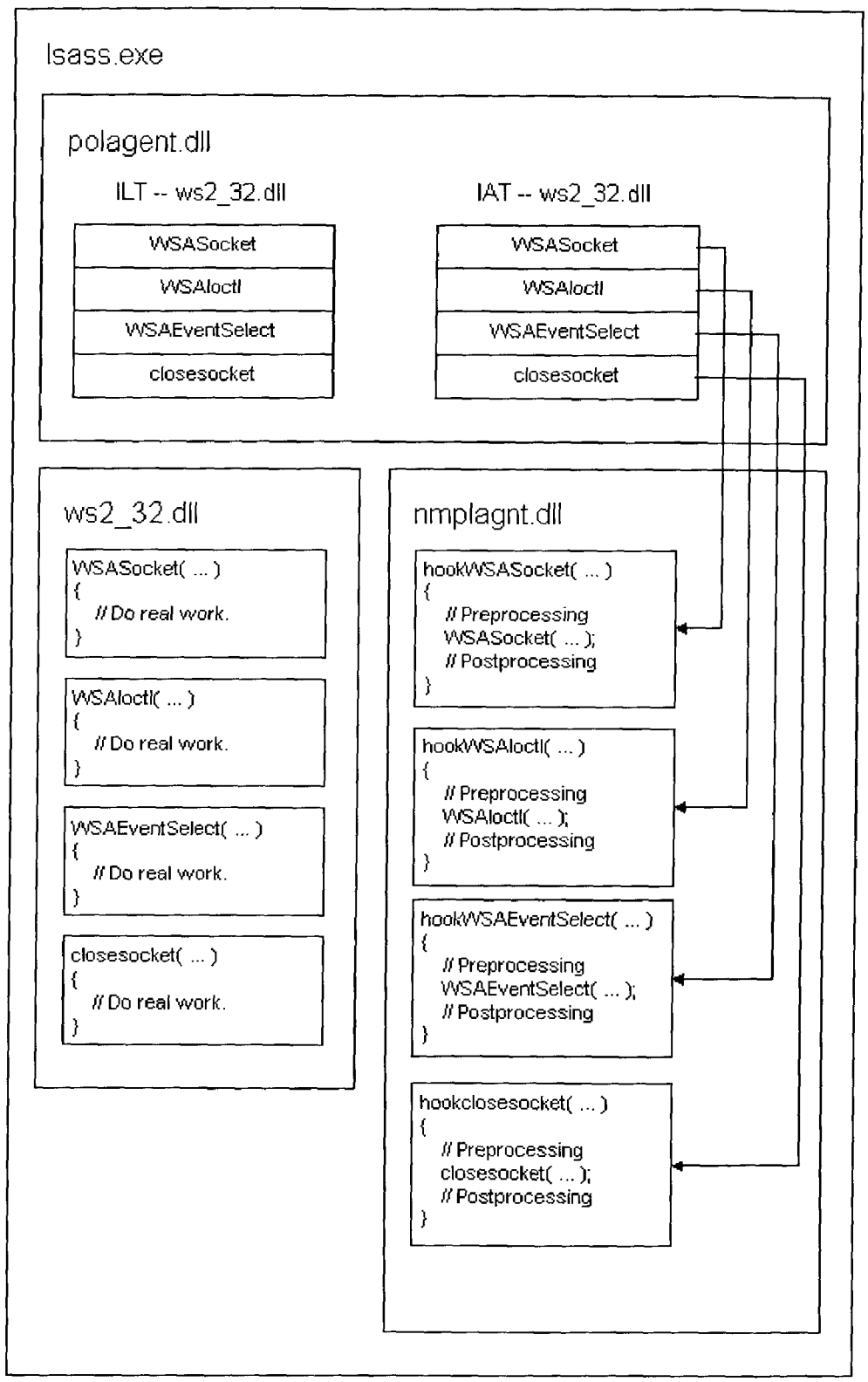
Figure 9 – Example Client Policy Agent Hooking

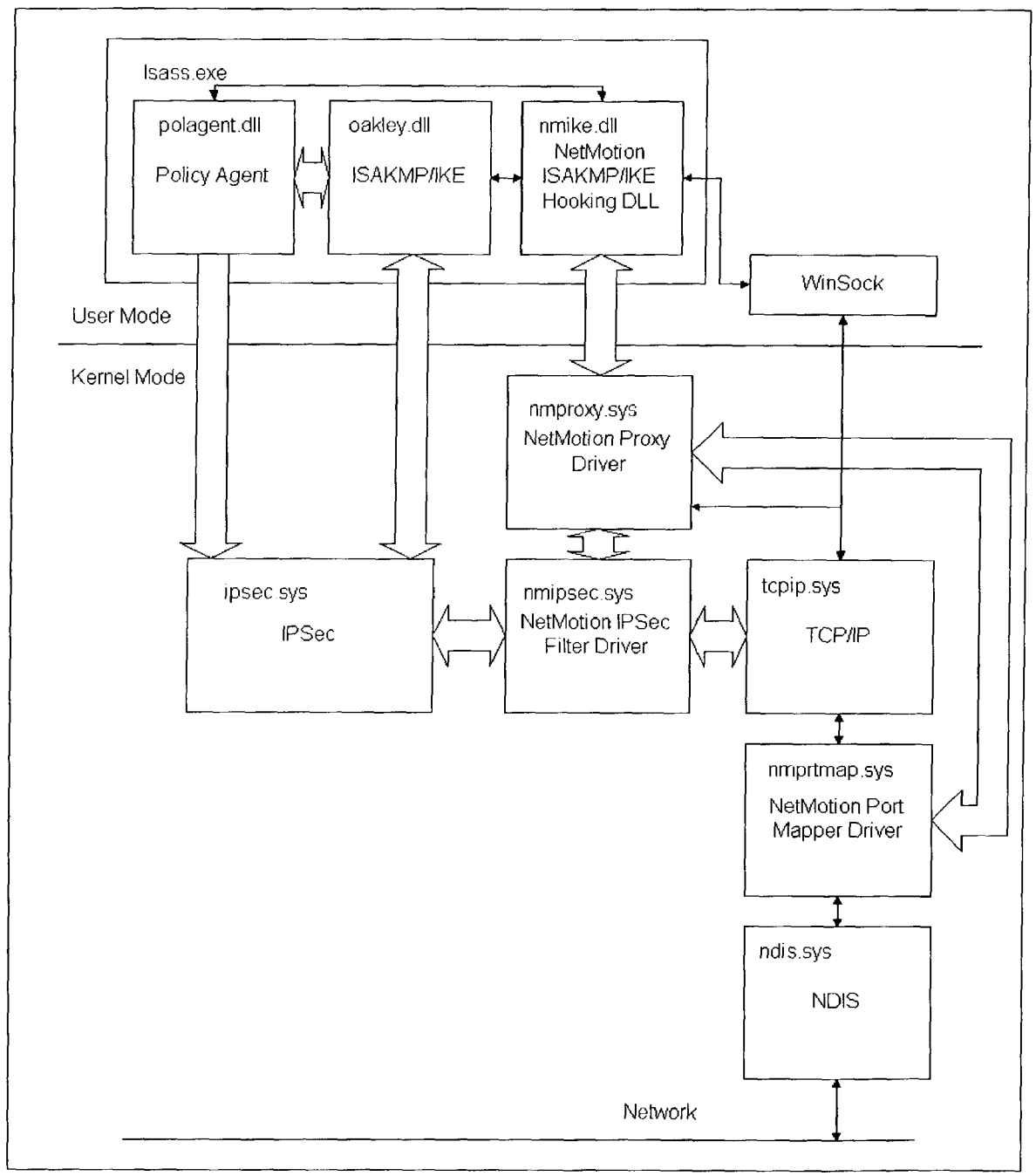
Figure 10 – Example Server Architecture

METHOD AND APPARATUS FOR PROVIDING SECURE CONNECTIVITY IN MOBILE AND OTHER INTERMITTENT COMPUTING ENVIRONMENTS

CROSS-REFERENCE TO RELATED APPLICATIONS

This application claims the benefit of priority from the following copending commonly-assigned related U.S. patent applications:

U.S. Provisional Application No. 60/347,243, filed Jan. 14, 2002;

U.S. Provisional Application Ser. No. 60/274,615 filed Mar. 12, 2001, entitled "Method And Apparatus For Providing Mobile and Other Intermittent Connectivity In A Computing Environment";

U.S. patent application Ser. No. 09/330,310 filed Jun. 11, 1999, entitled "Method And Apparatus For Providing Mobile and Other Intermittent Connectivity In A Computing Environment";

U.S. patent application Ser. No. 09/660,500 filed Sep. 12, 2000, entitled "Method And Apparatus For Providing Mobile and Other Intermittent Connectivity In A Computing Environment"; and PCT International Application Number PCT/US01/28391 filed Sep. 12, 2001, entitled "Method And Apparatus For Providing Mobile And Other Intermittent Connectivity In A Computing Environment".

All of the above-identified documents are incorporated herein by

STATEMENT REGARDING FEDERALLY SPONSORED RESEARCH OR DEVELOPMENT

Not applicable.

BACKGROUND AND SUMMARY OF THE INVENTION

Wireless networks have become very popular. Students are accessing course information from the college's computer network while sitting in lecture hall or enjoying the outdoors in the middle of the college campus. Doctors are maintaining computing connectivity with the hospital computer network while making their rounds. Office workers can continue to work on documents and access their email as they move from their office to a conference room. Laptop or PDA users in conference centers, hotels, airports and coffee houses can surf the web and access email and other applications over the Internet. Home users are using wireless networks to eliminate the need to run cables.

Wireless connectivity provides great flexibility but also presents security risks. Information transmitted through a cable or other wired network is generally secure because one must tap into the cable in order to access the transmission. However, information transmitted wirelessly can be received by anyone with a wireless receiver who is in range. Security risks may not present much of a problem to students reading course material or to cafe customers surfing the World Wide Web, but they present major concerns to businesses and professionals as well as their clients, customers and patients.

Generally, wired and wireless computing worlds operate under very different paradigms. The wired world assumes a fixed address and a constant connection with high bandwidth. A wireless environment, in contrast, exhibits intermittent connections and has higher error rates over what is usually a narrower bandwidth. As a result, applications and messaging protocols designed for the wired world don't always work in a wireless environment. However, the wireless expectations of end users are set by the performance and behaviors of their wired networks. Meeting these expectations creates a significant challenge to those who design and develop wireless networking architectures, software and devices.

Authenticating users and keeping communications confidential are more problematic in a wireless network than they are in a wired network. Wireless networks generally are subject to much greater varieties of attacks (e.g., man-in-the-middle, eavesdropping, "free rides" and wide area imposed threats) and assumptions that often do not apply to wired networks. For example, in modern network topologies such as wireless networks and Internet-based virtual private networks (VPNs), physical boundaries between public and private networks do not exist. In such networks, whether a user has the necessary permissions to access the system can no longer be assumed based on physical location as with a wired network in a secure facility. Additionally, wireless data is often broadcasted on radio frequencies, which can travel beyond the control of an organization, through walls and ceilings and even out into the parking lot or onto the street. The information the network is carrying is therefore susceptible to eavesdropping. Imagine if vital hospital patient information could be intercepted or even altered by an unauthorized person using a laptop computer in the hospital lobby, or if a corporate spy could learn his competitor's secrets by intercepting wireless transmissions from an office on the floor above or from a car in the parking lot. While tapping into a wired network cable in a secure facility is possible, the chances of this actually happening are less likely than interception of radio transmissions from a wireless network. Further security threats and problems must be faced when users wish to use any of the ever-increasing variety of public wireless networks to access sensitive data and applications.

Many of the open standards that make it possible for wireless network hardware vendors to create interoperable systems provide some form of security protection. For example, the IEEE 802.11b "Wi-Fi" standard has been widely implemented to provide wireless connectivity for all sorts of computing devices. It provides an optional Wired Equivalent Privacy ("WEP") functionality that has been widely implemented. Various additional wireless related standards attempt to address security problems in wireless networks, including for example:

Wireless Application Protocol (WAP) and the associated Wired Transport Layer Security (WTLS); and Mobile IP.

However, as explained below and as recognized throughout the industry, so far these standards have not provided a complete, easy-to-implement transparent security solution for mobile computing devices that roam between different networks or subnetworks.

WAP generally is designed to transmit data over low-bandwidth wireless networks to devices like mobile telephones, pagers, PDA's, and the like. The Wired Transport Layer Security (WTLS) protocol in WAP provides privacy, data integrity and authentication between WAP-based applications. A WAP gateway converts between the WAP protocol and standard web and/or Internet protocols such as HTTP and TCP/IP, and WTLS is used to create a secure, encrypted pipe. One issue with this model is that once the intermediate WAP gateway decrypts the data, it is available in clear text form—presenting an opportunity for the end-to-end security of the system to be compromised. Additionally, WAP has typically not been implemented for high-bandwidth scenarios such as wireless local area network personal computer connectivity.

WEP (Wired Equivalent Privacy) has the goal of providing a level of privacy that is equivalent to that of an unsecured wired local area network. WEP is an optional part of the IEEE 802.11 standard, but many hardware vendors have implemented WEP. WEP provides some degree of authentication and confidentiality, but also has some drawbacks and limitations.

To provide authentication and confidentiality, WEP generally relies on a default set of encryption keys that are shared between wireless devices (e.g., laptop computers with wireless LAN adapters) and wireless access points. Using WEP, a client with the correct encryption key can "unlock" the network and communicate with any access point on the wireless network; without the right key, however, the network rejects the link-level connection request. If they are configured to do so, WEP-enabled wireless devices and access points will also encrypt data before transmitting it, and an integrity check ensures that packets are not modified in transit. Without the correct key, the transmitted data cannot be decrypted—preventing other wireless devices from eavesdropping.

WEP is generally effective to protect the wireless link itself although some industry analysts have questioned the strength of the encryption that WEP currently uses. However, a major limitation of WEP is that the protection it offers does not extend beyond the wireless link itself. WEP generally offers no end-to-end protection once the data has been received by a wireless access point and needs to be forwarded to some other network destination. When data reaches the network access point or gateway, it is unencrypted and unprotected. Some additional security solution must generally be used to provide end-to-end authentication and privacy.

Mobile IP is another standard that attempts to solve some of the problems of wireless and other intermittently-connected networks. Generally, Mobile IP is a standards based algorithm that enables a mobile device to migrate its network point of attachment across homogeneous and heterogeneous network environments. Briefly, this Internet Standard specifies protocol enhancements that allow routing of Internet Protocol (IP) datagrams (e.g., messages) to mobile nodes in the Internet. See for example Perkins, C., "IP Mobility Support", RFC 2002, October 1996.

Mobile IP contemplates that each mobile node is always identified by its home address, regardless of its current point of attachment to the Internet. While situated away from its home, a mobile node is also associated with a "care-of" address, which provides information about its current point of attachment to the Internet. The protocol provides for registering the "care-of" address with a home agent. The home agent sends datagrams destined for the mobile node through a "tunnel" to the "care-of" address. After arriving at the end of the "tunnel," each datagram is then delivered to the mobile node.

While Mobile IP provides useful techniques for remote connectivity, it is not yet widely deployed/implemented. This seems to be due to a variety of factors—at least one of which is that there continues to be some unsolved problems or areas where the Mobile IP standard is lacking and further enhancement or improvement would be desirable. For example, even though security is now fairly widely recognized as being a very important aspect of mobile networking, the security components of Mobile IP are still mostly directed to a limited array of security problems such as redirection attacks.

Redirection attacks are a very real threat in any mobility system. For example, a redirection attack can occur when a malicious node gives false information to a home agent in a Mobile IP network (e.g., sometimes by simply replaying a previous message). This is similar to someone filing a false "change of address" form with the Post Office so that all your mail goes to someone else's mailbox. The home agent is informed that the mobile node has a new "care-of" address. However, in reality, this new "care-of" address is controlled by the malicious node. After this false registration occurs, all IP datagrams addressed to the mobile node are redirected to the malicious node.

While Mobile IP provides a mechanism to prevent redirection attacks, there are other significant security threats that need to be addressed before an enterprise can feel comfortable with the security of their wireless network solution. For example, Mobile IP generally does not provide a comprehensive security solution including mobile computing capabilities such as:

Session resilience/persistence
Policy management
Distributed firewall functionality
Location based services
Power management
Other capabilities.

While much security work has been done by the Internet community to date in the Mobile IP and other contexts, better solutions are still possible and desirable. In particular, there continues to be a need to provide an easy-to-use, comprehensive mobility solution for enterprises and other organizations who wish to add end-to-end security to existing and new infrastructures that make extensive use of existing conventional technology and standards and which support mobility including roaming transparently to applications that may not be "mobile-aware." Some solutions exist, but many of them require changes to existing infrastructure that can be difficult to implement and maintain.

For example, in terms of the current implementations that do exist, Mobile IP is sometimes implemented as a "bump" in the TCP/IP protocol stack to replace components of the existing operating system environment. An example of such an architecture is shown in prior art FIG. 1. In the exemplary illustrative prior art arrangement shown, a Mobile IP module sits below the regular TCP/IP protocol stack components and manages the transitions from one network to another. Generally, using such solution, additions or modifications to existing core network infrastructure entities are needed to facilitate the behavior of nomadic or migratory computing. The need for such modifications makes widespread implementation difficult and causes problems in terms of maintainability and compatibility.

Another common security solution that enterprises have gravitated toward is something called a Virtual Private Network (VPN). VPNs are common on both wired and wireless networks. Generally, they connect network components and resources through a secure protocol tunnel so that devices connected to separate networks appear to share a common, private backbone. VPN's accomplish this by allowing the user to "tunnel" through the wireless network or other public network in such a way that the "tunnel" participants enjoy at least the same level of confidentiality and features as when they are attached to a private wired network. Before a "tunnel" can be established, cryptographic methods are used to establish and authenticate the identity of the tunnel participants. For the duration of the VPN connection, information traversing the tunnel can be encrypted to provide privacy.

VPN's provide an end-to-end security overlay for two nodes communicating over an insecure network or networks. VPN functionality at each node supplies additional authentication and privacy in case other network security is breached or does not exist. VPN's have been widely adopted in a variety of network contexts such as for example allowing a user to connect to his or her office local area network via an insecure home Internet connection. Such solutions can offer strong encryption such as the AES (Advanced Encryption Standard), compression, and link optimizations to reduce protocol chattiness. However, many or most VPNs do not let users roam between subnets or networks without "breaking" the secure tunnel. Also, many or most VPNs do not permit transport, security and application sessions to remain established during roaming. Another potential stumbling block is conventional operating systems—not all of which are compatible with the protection of existing wireless VPNs.

To address some of the roaming issue, as previously mentioned, standards efforts have defined Mobile IP. However, Mobile IP, for example, operates at the network layer and therefore does not generally provide for session persistence/resilience. If the mobile node is out of range or suspended for a reasonably short period of time, it is likely that established network sessions will be dropped. This can present severe problems in terms of usability and productivity. Session persistence is desirable since it lets the user keep the established session and VPN tunnel connected—even if a coverage hole is entered during an application transaction. Industry analysts and the Wireless Ethernet Compatibility Alliance recommend that enterprises deploy VPN technology, which directly addresses the security problem, and also provides advanced features like network and subnet roaming, session persistence for intermittent connections, and battery life management for mobile devices. However, VPN solutions should desirably support standard security encryption algorithms and wireless optimizations suitable for today's smaller wireless devices, and should desirably also require no or minimal modification to existing infrastructure.

One standards-based security architecture and protocol approach that has been adopted for providing end-to-end secure communications is called "Internet Security Protocol" ("IPSec"). IPSec is a collection of open standards developed by the Internet Engineering Task Force (IETF) to secure communications over public and private networks. See for example:

RFC 1827 "IP Encapsulating Security Payload (ESP)" R. Atkinson (August 1995);

RFC 1826 "IP Authentication Header" R. Atkinson. (August 1995); and

RFC 1825 "Security Architecture for the Internet Protocol" R. Atkinson (August 1995).

Briefly, IPSec is a framework for ensuring private, secure communications over Internet Protocol (IP) networks, through the use of cryptographic security services. The IPSec suite of cryptography-based protection services and security protocols provides computer-level user and message authentication, as well as data encryption, data integrity checks, and message confidentiality. IPSec capabilities include cryptographic key exchange and management, message header authentication, hash message authentication, an encapsulating security payload protocol, Triple Data Encryption, the Advanced Encryption Standard, and other features. In more detail, IPSec provides a transport mode that encrypts message payload, and also provides a tunnel mode that encrypts the payload, the header and the routing information for each message. To reduce overhead, IPSec uses policy-based administration. IPSec policies, rather than application programming interfaces (APIs), are used to configure IPSec security services. The policies provide variable levels of protection for most traffic types in most existing networks. One can configure IPSec policies to meet the security requirements of a computer, application, organizational unit, domain, site, or global enterprise based on IP address and/or port number.

IPSec is commonly used in firewalls, authentication products and VPNs. Additionally, Microsoft has implemented IPSec as part of its Windows 2000 and Windows XP operating system. IPSec's tunnel mode is especially useful in creating secure end-to-end VPNs. IPSec VPNs based on public key cryptography provide secure end-to-end message authentication and privacy. IPSec endpoints act as databases that manage and distribute cryptographic keys and security associations. Properly implemented, IPSec can provide private channels for exchanging vulnerable data such as email, file downloads, news feeds, medical records, multimedia, or any other type of information.

One might initially expect that it should be relatively straightforward to add a security algorithm such as the standards-based IPSec security algorithm to Mobile IP or other mobility protocol. For example, layering each of the entities in the fashion such as that shown in prior art FIG. 2 would seem to allow for security in an environment where the mobile node's IP address never needs to change. Thus, the IPSec security association between the mobile node and its ultimate peer could be preserved across network segment boundaries, and end-to-end security would also preserved. However, combining the Mobile IP and IPSec algorithms in this manner can present its own set of problems.

For example, when the mobile node has roamed to a foreign network and is communicating with its ultimate peer, it is possible that packets generated by the mobile node may be discarded by a policy enforcement entity such as a firewall. This can be due to common practice known as ingress filtering rules. Many firewalls discard packets generated by mobile nodes using their home addresses (internal network identity) and received on an externally facing network interface in defense of the network. This discarding process is intended to protect the network secured by the firewall from being attacked. Ingress filtering has the effect of forcing the tunneling of Mobile IP frames in both directions. See for example RFC 2356 Sun's SKIP Firewall Traversal for Mobile IP. G. Montenegro, V. Gupta. (June 1998).

Additionally, it is becoming general practice in the industry to require that an IPSec security session be established between the foreign agent and the externally facing policy enforcement equipment (e.g. firewall) before allowing packets to traverse between the external and internal network interconnection (a.k.a. VPN). If the foreign agent is co-located with the mobile node, this can become a cumbersome operation. As exemplary FIG. 3 depicts, yet another level of network protocol enveloping could be used to meet possibly required security policies to allow network traffic to flow between the mobile node to the foreign agent through the policy enforcement equipment (e.g. firewall) to the home agent and then to the other communications end point (i.e. ultimate peer). However, this adds substantial additional overhead due to the additional encapsulation. Furthermore, if the foreign agent entity is not co-located with the mobile node (or up to policy restrictions on the newly attached network), a specific foreign agent may need to be used for these communications, and credential information must somehow be shared between the foreign agent and the terminus of the first (outer) IPSec session. A drawback to this methodology is that it can increase the security risk by sharing credential information with a network entity that may not be directly under user or corporate administrative control.

What is needed is a solution to these problems providing security, network roaming, and session persistence over conventional information communications networks including but not limited to standard IP based networks without requiring modification to existing network applications. Additionally, it would be useful if such a solution did not require the deployment of Mobile IP or any additional infrastructure such as a foreign agent when visiting a remote network, and the functionality can be transparent to networked applications so they do not need to be modified either.

This invention solves this problem by transparently providing secure, persistent, roamable IP-based communications using conventional technologies such as IPSec, Microsoft or other operating system security functionality while avoiding the commonly experienced ingress filtering problems. And unlike at least some implementations of Mobile IP, few if any changes are necessary to the underlying network infrastructure.

Generally, one preferred exemplary non-limiting embodiment provides Mobility Client (MC) functionality that virtualizes the underlying network. Applications running on the mobility client see at least one consistent virtual network identity (e.g. IP address). When an application on the mobility client makes a network request, the mobility client intercepts the request and marshals the request to a Mobility Server (MS) that supports security such as IPSEC. The mobility server unwraps the request and places it on the network as though the server were the client—thus acting as a proxy for the client.

The reverse also occurs in the exemplary embodiment. When a peer host sends a packet to the mobility client's virtual network identity, the packet is first received by the mobility server and is then transferred to the mobility client. The mobility server maintains a stable point of communication for the peer hosts while the mobility client is free to roam among networks as well as suspend or roam out of range of any network. When the mobility client is out of range, the mobility server keeps the mobility client's sessions alive and queues requests for the mobility client. When the mobility client is once again reachable, the mobility server and client transfer any queued data and communication can resume where it left off.

Preferred exemplary non-limiting implementations thus offer wireless optimizations and network and application session persistence in the context of a secure VPN or other connection. Wireless optimizations allow data to be transmitted as efficiently as possible to make maximal use of existing bandwidth. For example, the system can be used to switch automatically to the fastest bandwidth network connection when multiple connections (Wi-Fi and GPRS, for example) are active. Network session persistence means that users don't have to repeat the login process when they move from one IP subnet to another, or when they go out of range of the network and return. Exemplary implementations automatically re-authenticate the connection every time users roam, without need for user intervention. Application session persistence means that standard network applications remain connected to their peers, preventing the loss of valuable user time and data. Such optimizations and persistence is provided in the context of a security architecture providing end-to-end security for authentication and privacy.

In one illustrative embodiment, before data is transported between the network and a mobility client, the network ensures that the end user has the required permissions. A user establishes her identity by logging in to the mobility client using a conventional (e.g., Windows) domain user name and password. Using the conventional domain credentials allows for a single sign-on process and requires no additional authentication tables or other infrastructure additions. Single sign-on also gives users access to other domain resources such as file system shares. Once a user has been authenticated, a communications path is established for transporting application data. Any number of different protocols (e.g., Common Internet File System, Radius, other) can be used for user authentication. Using certain of these protocols, a mobility server can act as a Network Access Server to secure an initial access negotiation which establishes the user's user name and password using conventional protocols such as EAP-MD5, LEAP, or other protocol. Unlike some wireless protocols, such authentication in the exemplary non-limiting implementations provides user-specific passwords that can be used for policy management allowing access and resource allocation on a user basis.

Significantly, exemplary non-limiting implementations can be easily integrated with IPSEC or other security features in conventional operating systems such as for example Windows NT and Windows 2000. This allows access to conventional VPN and/or other proven-secure connection technology. IPSec policies can be assigned through the group policy feature of Active Directory, for example. This allows IPSec policy to be assigned at the domain or organizational level—reducing the administrative overhead of configuring each computer individually. An on-demand security negotiation and automatic key management service can also be provided using the conventional IETF-defined Internet Key Exchange (IKE) as specified in Internet RFC 2409. Such exemplary implementations can provide IEFT standards-based authentication methods to establish trust relationships between computers using public key cryptography based certificates and/or passwords such as preshared keys. Integration with conventional standards-based security features such as public key infrastructure gives access to a variety of security solutions including secure mail, secure web sites, secure web communications, smart card logon processes, IPSec client authentication, and others.

Illustrative exemplary embodiments can be cognizant of changes in network identity, and can selectively manage transition in network connectivity, possibly resulting in the termination and/or (re)instantiation of IPSec security sessions between communicating entities over at least one of a plurality of network interfaces. Exemplary illustrative embodiments also provide for the central management, distribution, and/or execution of policy rules for the establishment and/or termination of IP security sessions as well as other parameters governing the behavior for granting, denying and/or delaying the consumption of network resources.

Illustrative non-limiting advantageous features include:
Roamable IPSec allows IPSec tunnel to automatically roam with mobile computing devices wherever they go—based on recognized IPSec security standard, Roamable IPSec enables seamless roaming across any physical or electronic boundary with the authentication, integrity and encryption of IPSec, to provide a standards-based solution allowing mobile and remote users with VPN-level security and encryption in an IPSec tunnel that seamlessly roams with wireless users wherever they go and however they access their enterprise data.
Detecting when a change in network point of attachment, an interruption of network connectivity, a roam to a different network or other subnetworks, a mobile client's identify, or other discontinuity has occurred on the mobile client and (re)instantiating an IP Security session while maintaining network application sessions—all in a manner that is transparent to the networked application.

Transparently and selectively injecting computer instructions and redirecting the execution path of at least one software or other component based for example on process name to achieve additional level(s) of functionality while maintaining binary compatibility with operating system components, transport protocol engines, and/or applications.

Selectively but transparently virtualizing at least one network interface for applications and operating system components—shielding them from the characteristics of mobile computing while allowing other components to remain cognizant of interruptions in connectivity and changes in network point of attachment.

Selectively virtualizing at least one network interface for network applications and operating system components thus shielding them from adverse events that may disturb communications such as changes in network point of attachment and/or periods of disconnectedness.

Allowing the establishment of multiple IP Security sessions over one or more network interfaces associated with at least one network point of attachment and allowing network application communications to simultaneously flow over any or all of the multiple IP security sessions and correctly multiplex/demultiplex these distributed communication flows into corresponding higher layer communications sessions.

Applying policy rules to selectively allow, deny, and/or delay the flow of network communications over at least one of a plurality of IP Security sessions.

Centrally managing and/or distributing policy regarding the establishment of IP Security sessions from a central authority.

An "Add session" concept—during the proxying of communications for a mobile client, the mobility server can instantiate at least one of a possible plurality of IP Security sessions between a mobility server and an ultimate peer on behalf of a mobility client.

Establishing and maintaining IP Security sessions between the Mobility Server and ultimate communications peer, even during periods when the mobility client is unreachable.

Automatically terminating IP Security sessions between the mobility server and ultimate communications peer, based on, but not limited to link inactivity, application session inactivity, or termination of a communications end point.

Associating at least one IP security session between the mobility server and ultimate peer and mobility client and mobility server regardless of the current mobility client network identities.

Transparently injecting computer instructions and redirecting the execution path to achieve additional level(s) of functionality while maintaining binary compatibility with operating system components, transport protocol engines, and applications.

Allowing establishment of at least one of a plurality of IP security sessions over a plurality of network interfaces associated with at least one network point of attachment and allowing network application communications to simultaneously flow over at least one of a plurality of IP Security sessions and correctly multiplex/demultiplex these distributed communication flows back into corresponding higher layer communications sessions.

Selectively virtualizing at least one network interface for network applications and operating system components thus shielding them any adverse events that may disrupt communications such as changes in network point of attachment and/or periods of disconnectedness.

Centrally managing and distributing policy rules regarding the establishment and/or termination of IP security sessions for mobile clients and/or mobility servers from a central authority.

A mobility security solution that starts at the mobile device and provides both secure user authentication and, when needed, secure data encryption.

A mobility security solution that voids the need for single-vendor solutions not based on industry-wide, open and other standards.

Secure VPN that is extendable to a variety of different public data networks having different configurations (e.g., Wi-Fi network hotspot, wide-area wireless solutions such as CDPD or GPRS, etc.) dynamically controllable by the network administrator A mobility security solution that works with a wide variety of different computing devices of different configurations running different operating systems.

Allows users to suspend and reestablish secure sessions to conserve battery power while maintaining network application sessions.

Provides a secure solution in a wireless topology that has dead spots and coverage holes.

No need to develop custom mobile applications or use mobile libraries to get applications to work in a mobile environment.

Secure transport and application session persistence works within existing network security so the network is not compromised.

compatible with any of a variety of conventional security protocols including for example RADIUS, Kerberos, Public Key Infrastructure (PKI), and Internet Security Protocol (IPSec).

The computing environment and the applications do not need to change mobility is there to use but its use is transparent to the user and to the applications.

Since all or nearly all applications run unmodified, neither re-development nor user re-training is required.

Automatic regeneration of user-session keys at a customized interval.

Continuous, secure connection ensuring data integrity between wired and wireless data networks.

Enterprises running VPNs (e.g., PPTP, L2TP/IPSec, IPSec, Nortel, Cisco, other) can use these techniques to add wireless optimization, session persistence and additional security for mobile workers.

Seamlessly integrates into enterprises where LEAP or other access point authentication security is deployed to add optimized roamable security and encryption.

BRIEF DESCRIPTION OF THE DRAWINGS

These and other features and advantages may be better and more completely understood by referring to the following detailed description of exemplary non-limiting illustrative embodiments in conjunction with drawings, of which:

FIG. 1 shows an exemplary illustrative prior art mobile IP client architecture;

FIG. 2 shows an exemplary illustrative prior art IPSec and Mobile IP architecture;

FIG. 3 shows an exemplary illustrative network protocol enveloping that may be used to meet the possible required security policies to allow network traffic to flow between a mobile node to a foreign agent through policy enforcement equipment (e.g. firewall) to the home agent and then to another communications end point;

FIG. 4 shows an example mobility architecture in accordance with a presently preferred exemplary illustrative non-limiting embodiment of the present invention;

FIGS. 5 & 5A-5F show illustrative usage scenarios;

FIG. 6 shows an example simplified prior art operating system security architecture;

FIG. 7 shows the example illustrative FIG. 6 architecture modified to provide secure transparent illustrative mobility functionality;

FIG. 8 shows an example illustrative run time linking sample;

FIG. 9 shows an example illustrative client policy agent hooking; and

FIG. 10 shows an example illustrative server architecture.

DETAILED DESCRIPTION OF EXEMPLARY NON-LIMITING EMBODIMENTS

Figure 5A:
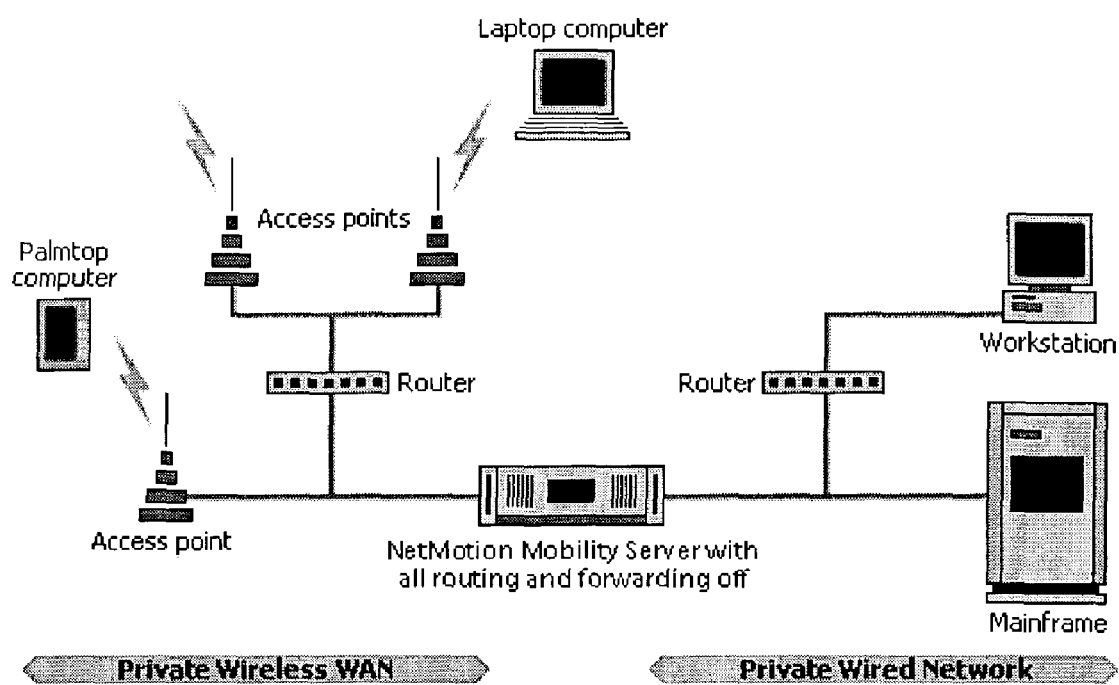

FIG. 4 shows an exemplary overall illustrative non-limiting mobility architecture. The example mobility architecture includes a mobility client (MC) and a mobility server (MS). The mobility client may be, for example, any sort of computing device such as a laptop, a palm top, a Pocket PC, a cellular telephone, a desktop computer, or any of a variety of other appliances having remote connectivity capabilities. In one exemplary embodiment, mobility client MC comprises a computing-capable platform that runs the Microsoft Windows 2000/XP operating system having security (for example, IPSec) functionality but other implementations are also possible. The system shown is scaleable and can accommodate any number of mobility clients and mobility servers.

In one exemplary embodiment, mobility client MC may be coupled to a network such as the Internet, a corporate LAN or WAN, an Intranet, or any other computer network. Such coupling can be wirelessly via a radio communications link such as for example a cellular telephone network or any other wireless radio or other communications link. In some embodiments, mobility client MC may be intermittently coupled to the network. The system shown is not, however, limited to wireless connectivity—wired connectivity can also be supported for example in the context of computing devices that are intermittently connected to a wired network. The wireless or other connectivity can be in the context of a local area network, a wide area network, or other network.

In the exemplary embodiment, mobility client MC communicates with the network using Internet Protocol (IP) or other suitable protocol over at least one of a plurality of possible network interfaces. In the illustrative embodiment, mobility server (MS) is also connected to the network over at least one of a plurality of possible network interfaces. The mobility server MS may communicate with one or more peers or other computing devices. The exemplary FIG. 4 architecture allows mobility client MC to securely communicate with the peer hosts via the communications link, the network and/or the mobility server MS.

In more detail, the FIG. 4 mobility server maintains the state of each mobile device and handles the session management required to maintain continuous connections to network applications. When a mobile device becomes unreachable because it suspends, moves out of coverage or changes its "point of presence" address, the mobility server maintains the connection to the network host by acknowledging receipt of data and queuing requests.

The exemplary mobility server also manages network addresses for the mobile devices. Each device running on the mobile device has a virtual address on the network and a point of presence address. A standard protocol (e.g., DHCP) or static assignment determines the virtual address. While the point of presence address of a mobile device will change when the device moves from one subnet to another (the virtual address stays constant while the connections are active).

This illustrative arrangement works with standard transport protocols such as TCP/IP—intelligence on the mobile device and the mobility server assures that an application running on the mobile device remains in sync with its server.

The mobility server also provides centralized system management through console applications and exhaustive metrics. A system administrator can use these tools to configure and manage remote connections, troubleshoot problems, and conduct traffic studies.

The mobility server also, in the exemplary embodiment, manages the security of data that passes between it and the mobile devices on the public airways or on a wireline network. The server provides a firewall function by giving only authenticated devices access to the network. The mobility server can also certify and optionally encrypt all communications between the server and the mobile device. Tight integration with Active Directory or other directory/name service provides centralized user policy management for security.

The FIG. 4 architecture can be applied in any or all of a large and varying number of situations including but not limited to the exemplary situations shown in FIG. 5 (for brevity and clarity sake, example embodiments are described using a single network point of attachment but it will be appreciated and understood that the current invention is not to be limited to such scope and application):

At example location number one shown in FIG. 5 and see also FIG. 5A, the mobility client (depicted as a laptop computer for purposes of illustration) is shown inside a corporate or other firewall, and is shown connected to a wireless LAN (WLAN) having an access point. In this example, a private wireless network is connected to a wireline network through the mobility server. All application traffic generated on or destined for the wireless network is secured, and no other network traffic is bridged or routed to the wireless network. Using standard firewall features found in the operating system, the system can be further configured to allow only mobility traffic to be processed by the mobility server on the wireless network. In this example, the mobility client is authenticated to the mobility server. Packets flow normally between the mobility client and the mobility server, and the communication channel between the mobility client and the mobility server is protected using the conventional IPSec security protocol.

At example location number two shown in FIG. 5, the mobility client has moved into a dead-spot and lost connectivity with the network. The mobility server maintains the mobility client's network applications sessions during this time. Had the mobile client been using Mobile IP instead of the exemplary embodiment herein, the client's sessions could have been dropped because Mobile IP does not offer session persistence.

At example location number three, the mobility client has moved back into range of the corporate network on a different subnet. The mobility client acquires a new point-of-presence (POP) address on the new subnet, negotiates a new secure channel back to the mobility server using IPSec, reauthenticates with the mobility server, and resumes the previously suspended network sessions without intervention from the user and without restarting the applications. This process is transparent to the mobile applications and to the application server.

Figure 5B:
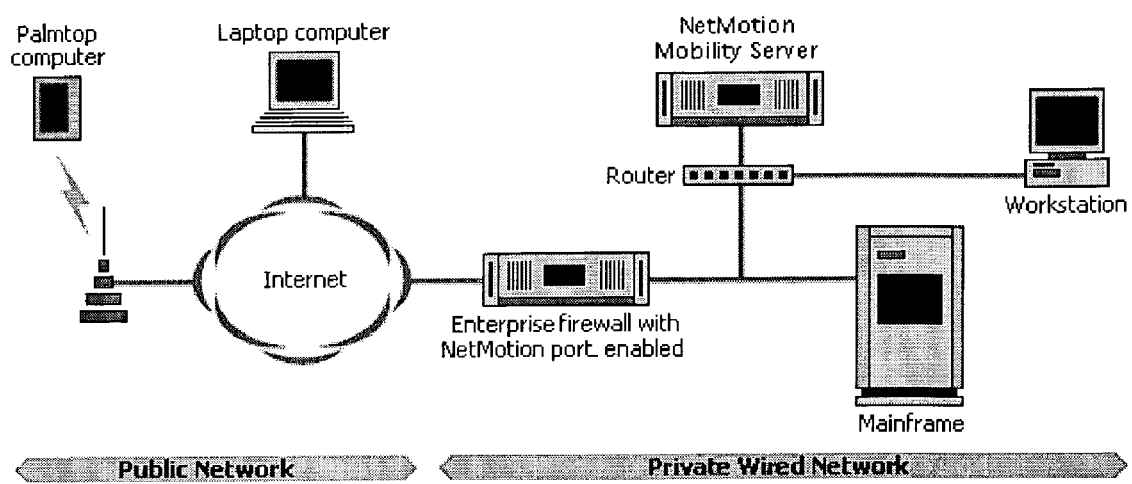
Figure 5C:
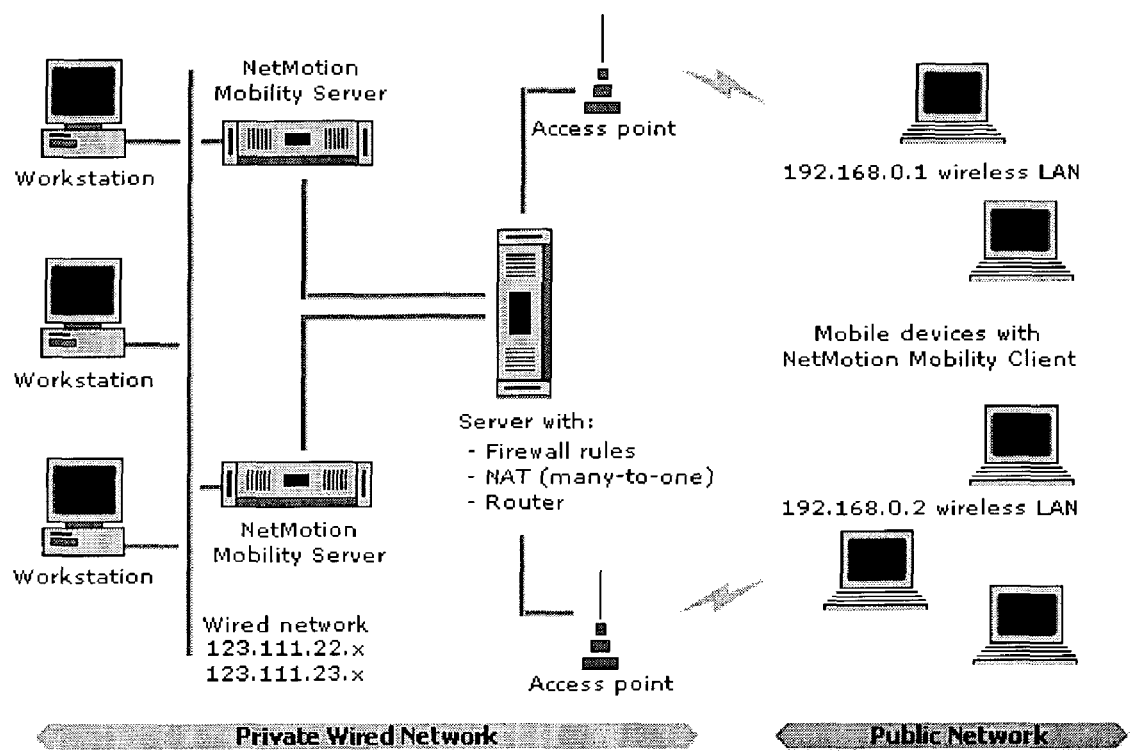

At example location numbers four and five shown in FIG. 5 and see also FIGS. 5B & 5C, the mobility client has left the corporate network and roamed into range of public networks. For example, the mobile client at location 4 shown in FIG. 5 is shown in range of a conventional Wireless Wide Area Network (WWAN) wireless tower, and the mobile client at location 5 shown in FIG. 5 is shown in range of a Wi-Fl or other wireless access point "hot spot" such as found in an airport terminal, conference center, coffee house, etc. The wireless technology used for the public network need not be the same as that used inside the enterprise—since the illustrative system provides for secure roaming across heterogeneous networks. The mobility client's traffic must now pass through a corporate or other firewall. The firewall can be configured to pass IPSec traffic intended for the mobility server and/or the mobility client can be configured to use an IPSec session to the firewall. Either solution can be implemented without end-user interaction, although intervention is possible.

In the FIG. 5B example, mobility devices are connected to a diverse, public wide area network. The enterprise is also connected to the public network through a conventional firewall. The firewall is, in the exemplary embodiment, modified to allow mobility connections, specifically to the address of the mobility server. The connections are then protected by conventional security protocols such as IPSec.

In the FIG. 5C example, a private, wired network on a corporate, hospital, or other campus, and a wireless local area network supporting mobile devices connected to it through a conventional firewall. Traffic from the public to the private network that is not destined for the correct port is denied using conventional firewall rules. The firewall rules can specify either the domain ("allow access to 123.111.x:5008") or the addresses of particular mobility servers ("allow access to 123.111.22.3:1002 and 123.111.23.4:5008")—the latter approach being more secure. On a smaller campus, a single, multi-homed mobility server could be used to handle both the wired and wireless LAN traffic. Once a user is authenticated, he or she has access to the wired network. A Network Address Translator (NAT) maybe used to reduce the number of public (routable) IP addresses required. In the example shown in FIG. 5C, a many-to-one relationship is provided so that mobile devices can use just one of two IP addresses instead of requiring one address each. Any traffic coming from the wireless LAN access points preferably must satisfy both the firewall rules and be cleared by the mobility server. With encryption enabled, this configuration protects the wired network while offering legitimate wireless users full, secure access to corporate data.

Figure 5D:
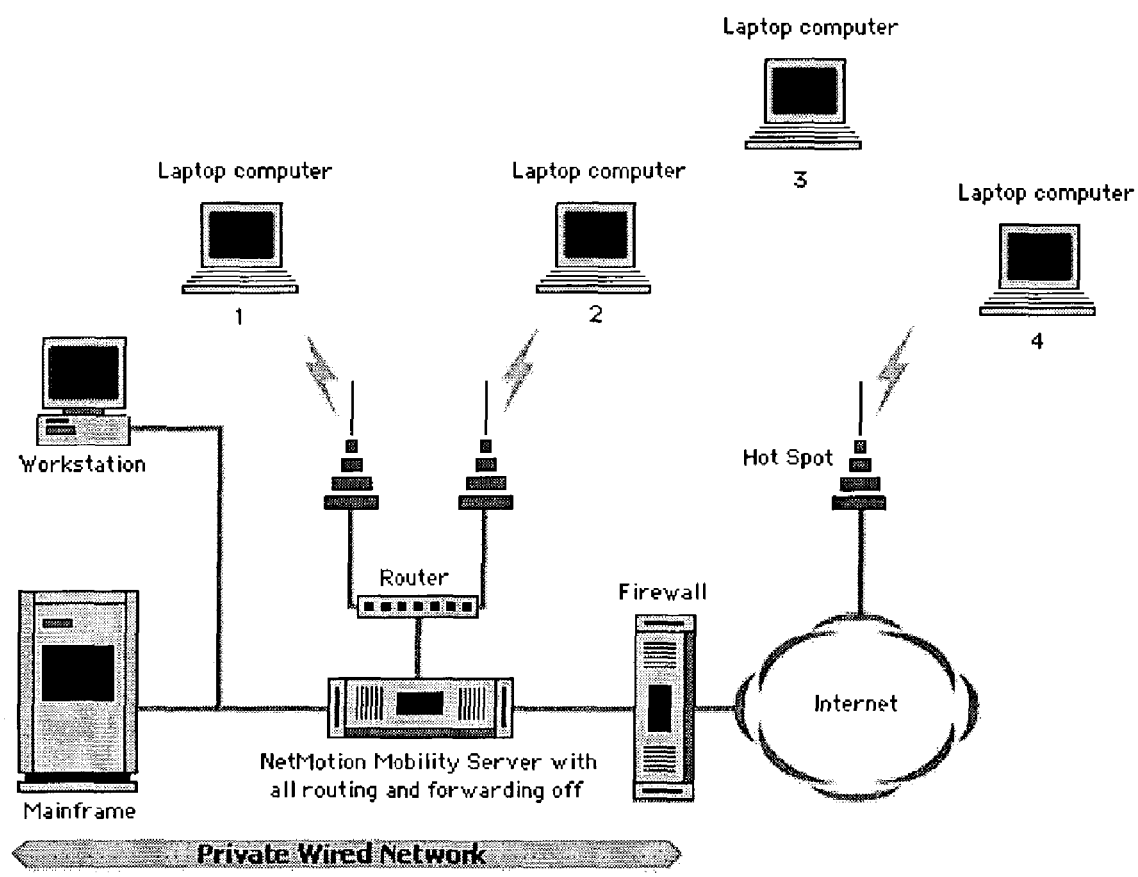

FIG. 5D shows an example configuration that allows users to roam securely across different networks both inside and outside of the corporate firewall. The mobility server sits behind the firewall. When the mobility client is inside the corporate firewall, connected to the wireless LAN (WLAN), and has been authenticated to the mobility server, packets flow normally and the communication channel between the mobile device and the mobility server (mobile VPN) is protected using IPSec. In this example, the Public Key Infrastructure, passwords and/or any other desired mechanism can be used to perform the key exchange for the IPSec tunnel. For added protection, WLAN access points inside the firewall can be configured to filter all protocols except for a desired one (e.g., IPSec). The mobility server acts as a VPN protecting the data as it traverses the wireless network with IPSec encryption. In this exemplary configuration, the mobility server also acts as a firewall by preventing intruders from accessing the private network. When the mobile device (client) moves into range of the corporate network on a different subnet, it acquires a new point-of-presence (POP) address on the new subnet, negotiates a new secure channel back to the mobility server using IPSec, re-authenticates with the mobility server, and resumes the previously suspended application sessions—all without user intervention being required. The applications can continue to run and the TCP or other connections can be maintained during this network transition since the network transition is transparent to the applications and the mobility server proxies communications on behalf of the mobile device during times when it is unreachable.

Figure 5E:
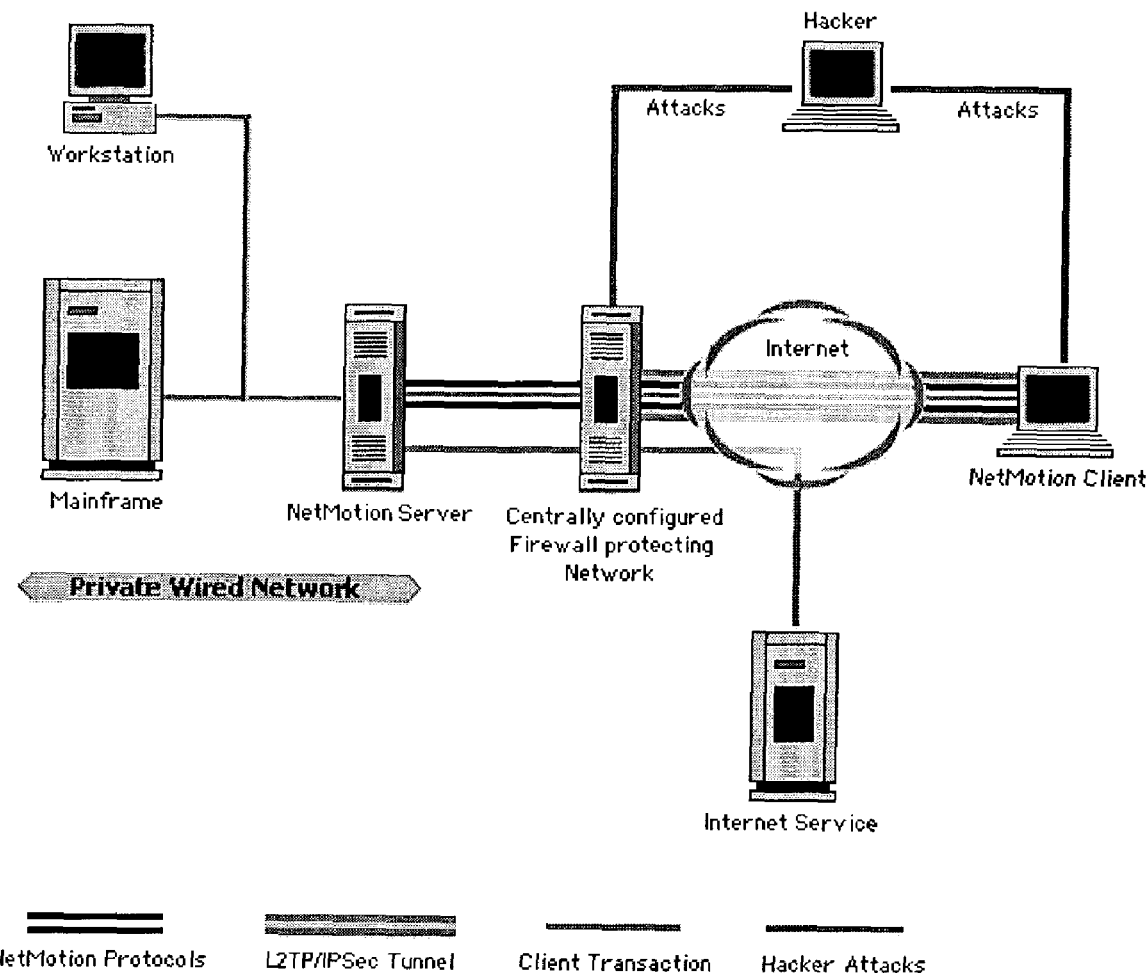

The FIG. 5E illustrative network configuration extends the protection of an enterprise firewall to its mobile clients. In this illustrative scenario, the mobility client is configured to use a conventional L2TP/IPSec tunnel to the firewall. IPSec filters on the mobile client can be configured to pass only authenticated IPSec packets to the mobile client's transport protocol stack and reject all other packets. The corporate firewall can be configured to reject all packets except for authenticated IPSec packets for trusted clients; any control channels necessary to set up secure connections; and responses to packets that originate from within the firewall for specifically permitted Internet or other network services. The mobility server located behind the firewall acts as a transport-level, proxy firewall. By proxying all network traffic, user transactions are forced through controlled software that protects the user's device from a wide variety of attacks including for example those using malformed packets, buffer overflows, fragmentation errors, and port scanning. Because the mobility server acts as a transport-level proxy, it can provide this protection transparently for a wide range of applications. Attacks against the network can be blocked by filter rules configured on the firewall and/or the proxy firewall capabilities of the mobility server. Attacks against the mobile device are prevented by the IPSec filter rules configured on the mobile client. Attempts to crack user passwords using sniffer attacks are thwarted by the secure tunnel provided by IPSec.

Figure 5F:
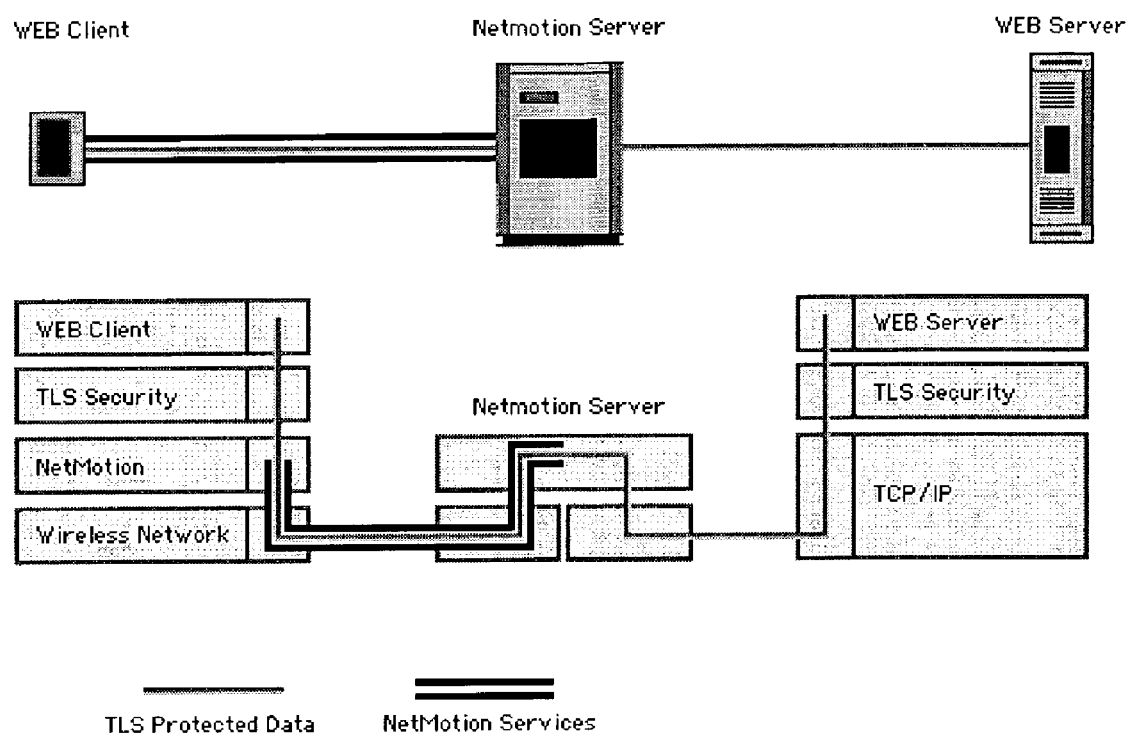
Figure 5G:
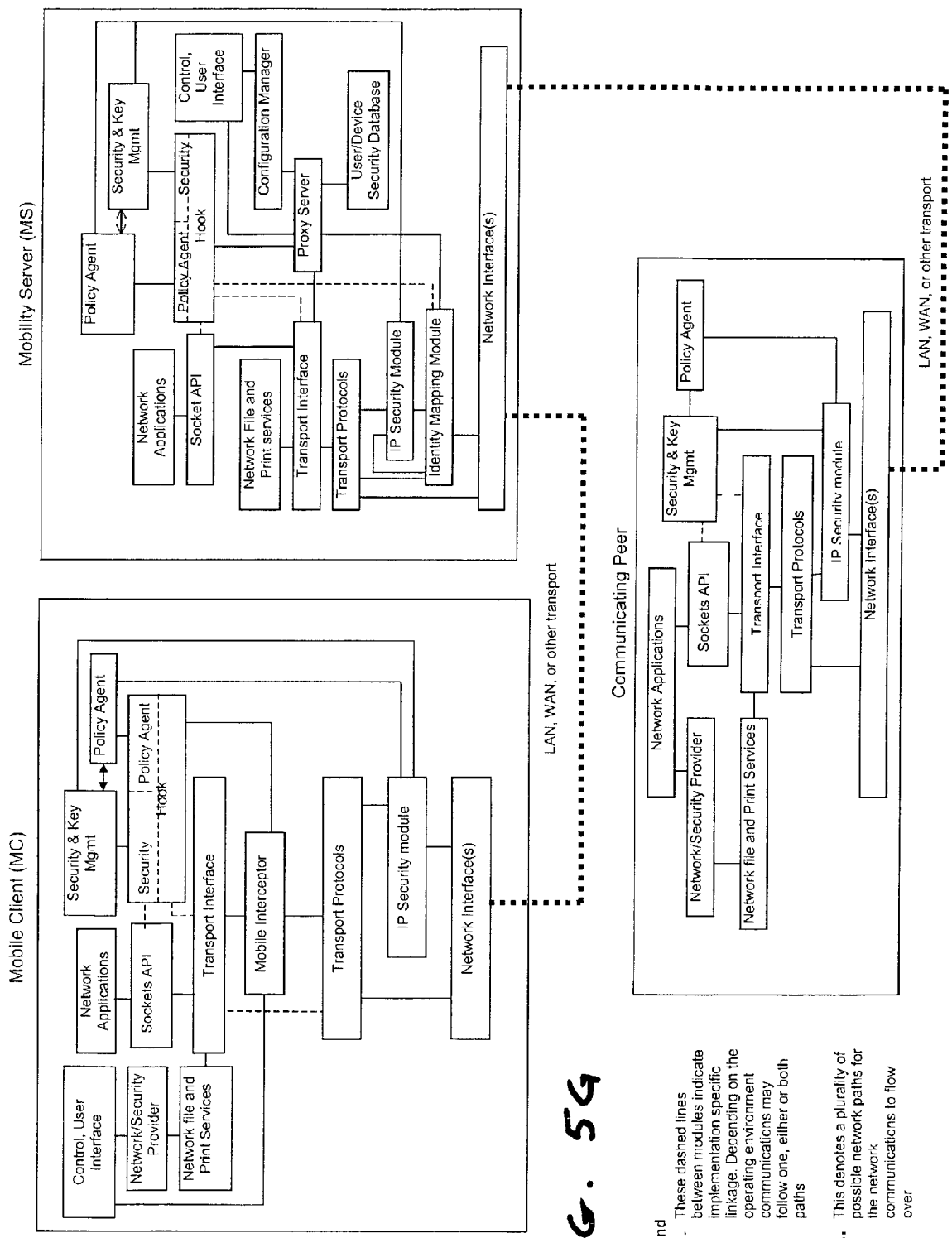
FIG. 5G shows an exemplary client-server architecture.

FIG. 5F shows an additional exemplary illustrative e-commerce model. Like WAP, the FIG. 5F arrangement provides optimizations that enhance performance and reliability on slow and unreliable wireless networks. Unlike WAP, the FIG. 5F system doesn't allow data to sit on an intermediate server in an unencrypted state. The FIG. 5F architecture allows standard web protocols such as HTTP and TLS to be used for e-commerce or other transactions (the web traffic is treated as a payload). The encrypted data is forwarded to its final destination (e.g., the web server) where is can be processed in the same way it would be if two wired peers were performing the same transaction. In addition to optimizations for wireless networks, the FIG. 5F system provides seamless roaming between different networks and application session persistence while devices are suspended or out of range of a wireless base station. When combined with the illustrative system's support for public key infrastructure and/or other security mechanisms, those capabilities form a powerful mobile e-commerce platform.

The scenarios described above are only illustrative—any number of other intermittent, mobile, nomadic or other connectivity scenarios could also be provided.

Exemplary Integration With IPSec Standards-Based Security Framework

Generally, the IPSec process of protecting frames can be broadly handled by three logically distinct functions. They are:

Policy configuration and administration
Security negotiation/key management
Privacy processing Although these processes are logically distinct, the responsibility for implementing the functionality may be shared by one or more modules or distributed in any manner within an operating or other system. For instance, in the exemplary illustrative client operating system embodiment, the implementation is broken into 3 functional areas or logical modules:

1. A Policy Agent module
2. A security negotiation and key management (e.g., ISAKMP/IKE) module
3. A privacy (e.g., IPSec) module.

In this illustrative example, the Policy Agent is responsible for the configuration and storage of the configured policy—however it is the IPSec module that actually acts upon the requested policy of the Policy Agent. The preferred exemplary illustrative system provides two different related but separated aspects:

the first aspect handles IPSec from the mobility client to the firewall or the mobility server; and
the other aspect handles communication on virtual addresses between the mobility server and peer hosts.

We first discuss exemplary illustrative communication to and from the mobility client.

Example Mobility Client Architecture

As part of the preferred embodiment's overall design, network roaming activity is normally hidden from the applications running on the mobility client—and thus, the application generally does not get informed of (or even need to know about) the details concerning mobility roaming. Briefly, as described in the various copending commonly-assigned patent applications and publications referenced above, each of the mobile devices executes a mobility management software client that supplies the mobile device with the intelligence to intercept network activity and relay it (e.g., via a mobile RPC or other protocol) to mobility management server. In the preferred embodiment, the mobility management client generally works transparently with operating system features present on the mobile device to keep client-site application sessions active when contact is lost with the network. A new, mobile interceptor/redirector component is inserted at the conventional transport protocol interface of the mobile device software architecture. While mobile interceptor/redirector could operate at a different level than the transport interface, there are advantages in having the mobile interceptor/redirector operate above the transport layer itself. This mobile interceptor or redirector transparently intercepts certain calls at this interface and routes them (e.g., via RPC and Internet Mobility Protocols and the standard transport protocols) to the mobility management server over the data communications network. The mobile interceptor/redirector thus can, for example, intercept network activity and relay it to server. The interceptor/redirector works transparently with operating system features to allow application sessions to remain active when the mobile device loses contact with the network.

This arrangement provides an advantageous degree of transparency to the application, to the network and to other network sources/destinations. However, we have found that IPSec is a special case. Between the mobility client and the mobility server or the mobility client and a firewall, IPSec is protecting the packets using the point-of-presence (POP) address. Therefore, in one exemplary embodiment, to allow the existing IPSec infrastructure to operate normally, it should preferably remain informed of the current state of the network. We have therefore modified our previous design to inform IPSec of the change of network status (e.g., so it can negotiate a IPSec session when network connectivity is reestablished) while continuing to shield the networked application and the rest of the operating system from the temporary loss of a network access. Before describing how that is done in one illustrative embodiment, we first explain—for purposes of illustration only the conventional Microsoft Windows 2000/XP operating system IPSec architecture shown in FIG. 6. Note that Windows 2000/XP and IPSec is described only for purposes of illustration—other operating systems and security arrangements could be used instead.

In Windows 2000/XP, the IPSec module is responsible for filtering and protecting frames. For additional information, see for example Weber, Chris, "Using IPSec in Windows 2000 and XP" (Security Focus 12/5/01). Briefly, however, by way of non-limiting illustrative example, before allowing a frame to be processed by the protocol stack or before transmitting the frame out on the network, the network stack first allows the IPSec module a chance to process the frame. The IPSec module applies whatever polices to the frame the Policy Agent requests for the corresponding network identity. In the event that the Policy Agent requires the IPSec module to protect a frame but it does not yet have the required security association (SA) with the peer in accordance with the requested policy, it issues a request to the security negotiation/key management module—in this illustrative case the ISAKMP/IKE (Internet Security Association and Key Management Protocol/Internet Key Exchange) module—to establish one. It is the responsibility of the ISAKMP/IKE module in this illustrative system to negotiate the requested security association and alert the IPSec (privacy) module as to the progress/status of the security association. Once the security association has been successfully established, the IPSec module continues its processing of the original frame.

In the illustrative embodiment, the Policy Agent uses conventional Microsoft Winsock API's (application programming interfaces) to monitor the state of the network and adjust its policies accordingly. However this is implementation-dependent as other interfaces may also be used to alert this logical component of the network state in other environments. Accordingly, the ISAKMP/IKE module also uses conventional Microsoft Winsock API's to perform security association negotiation as well as track network state changes in one exemplary embodiment.

Briefly, the above techniques establish a secure IPSec session that is generally tied to a particular IP address and/or port and must be essentially continuous in order to be maintained, as is well known. If the secure session is temporarily interrupted (e.g., because of a lost or suspended connection or a roam) and/or if the IP address and/or port changes, IPSec will terminate it. Unless something is done, terminating the secure IPSec session will cause the mobile application to lose communication even if the network session continues to appear to remain in place. The preferred illustrative exemplary embodiment solves this problem by introducing functionality ensuring that IPSec is passed sufficient information to allow it to react to-the secure session being lost while continuing to shield this fact from the application—and by allowing IPSec to (re)negotiate a secure session once the network connectivity is reestablished using the same or different IP address or port number—all transparently to the networked application. In this way, the exemplary illustrative application is not adversely affected by termination of a previous security session and the establishment of a new one—just as the application is not adversely affected by access to the previous network being terminated and then reestablished (or in the case of roaming, to a new network with a new network identity being provisioned in its place). Meanwhile, the mobility server during such interruptions continues to proxy communications with the peer(s) the mobile device is communicating with so that network application sessions are maintained and can pick up where they left off before the interruption occurred.

Mobility client-side and server-side support each have different requirements. Therefore the architectures are different in the exemplary illustrative embodiment. The block diagram of an exemplary client architecture is show in FIGS. 5G and 7. Note that as compared to conventional FIG. 6, we have added two additional components:

a Policy Agent Hooking component (nmplagnt), and
a network virtualizing component (nmdrv).

Briefly, in the preferred illustrative embodiment, the network-virtualizing component virtualizes the underlying client module network while selectively allowing the core operating system's IPSec infrastructure to continue to be informed about network state changes. In the illustrative embodiment, the Policy Agent Hooking component "hooks" certain Policy Agent functions and redirects such processing to the network-virtualizing component so that the normal function of IPSec can be somewhat modified.

In more detail, in the exemplary embodiment, the network-virtualizing component (nmdrv) uses the services of the existing networking stack and is the layer responsible for virtualizing the underlying client module network. It also initiates and maintains the connection with the mobility server. When a client network application asks for the list of local IP addresses, the network-virtualizing component (nmdrv) intercepts the request and returns at least one of a possible plurality of the mobility client's virtual network identities (e.g. virtual IP addresses).

However, to continue to allow the inherent IPSec components to operate in a normal fashion, the client architecture should preferably allow the associated IPSec modules to see and track the current point of presence (POP) network address(es). Therefore, in the exemplary embodiment, if a request for the list of network addresses is issued and the request originated in the IPSec process, the network-virtualizing module passes the request along to an inherent network stack without any filtering or modification. Therefore, both the Policy Agent (e.g., polagent.dll in Windows 2000, ipsecs-vc.dll in Windows XP) and the ISAKMP/IKE module are kept abreast of the mobility client's current POP address(es).

In the exemplary embodiment, the network-virtualizing module also tracks address changes. Without this component, the network stack would normally inform any associated applications of address list changes through the conventional application-programming interface, possibly by terminating the application communications end point. In the Microsoft operating systems, for example, this responsibility is normally funneled through the conventional Winsock module, which in turn would then inform any interested network applications of the respective changes. In the exemplary embodiment, the Policy Agent registers interest with Winsock (e.g., using the SIO_ADDRESS_LIST_CHANGE IOCTL via the conventional WSAIoctl function) and waits for the associated completion of the request. The Policy Agent may also be event driven and receive asynchronous notification of such network state changes. Again, in the illustrative exemplary embodiment, the Policy Agent also registers with Winsock a notification event for signaling (e.g., on FD_ADDRESS_LIST_CHANGE via the WSAEventSelect function). When the Policy Agent is alerted to an address list change, it retrieves the current list of addresses, adjusts its policies accordingly and updates the associated policy administration logic. It further informs the Security Negotiation/Key Exchange module, in this case the ISAKMP/IKE module, of the associated state change. The security negotiation/key exchange module (ISAKMP/IKE) module, in turn, updates its list of open connection endpoints for subsequent secure association (SA) negotiations.

In the exemplary embodiment, Winsock and associated applications are normally not allowed to see address list changes since this may disrupt normal application behavior and is handled by the network-virtualizing component. Therefore, in the preferred exemplary embodiment, another mechanism is used to inform the Policy Agent of changes with respect to the underlying network. To fulfill this requirement in the illustrative embodiment, the services of the Policy Agent Hooking module (nmplagnt) are employed.

To achieve the redirection of services, the illustrative embodiment employs the facilities of a hooking module (nmplagnt), and inserts the code into the policy administration, security negotiation, and key management (Policy Agent/ISAKMP/IKE) process(es) that are provided as part of the core operating system. In this illustrative embodiment, hooking only certain functions of the Policy Agent module to this redirected code is accomplished via a combination of manipulating the Import Address Table (IAT) together with the use of a technique known as code injection. Injection of the redirected functions is accomplished with the help of conventional operating system APIs (e.g. OpenProcess, VirtualAllocEx, ReadProcessMemory, WriteProcessMemory, and CreateRemoteThread) in the exemplary embodiment. In the preferred exemplary embodiment, once nmplagnt.dll is injected in lsass.exe executable module, it hooks LoadLibrary and FreeLibrary entries in lsasrv.dll so it can detect when the policy agent is loaded and unloaded. Of course, other implementations are possible depending on the particular operating environment.

Furthermore, the hooking technique in the illustrative embodiment takes advantage of the way in which the Microsoft Windows itself performs dynamic run-time linking. Generally, to facilitate code reuse, Microsoft Windows supports and uses extensively, Dynamic Link Libraries (DLLs). Through the use of DLL technology, a process is able to link to code at run-time. To call a function in a dynamically linked library, the caller must know the location (address) of the specific function in the DLL. It is the operating systems responsibility to resolve the linkage between the code modules and is accomplished via an exchange of formatted tables present in both the caller and callee's run-time code modules. The dynamic library being called contains an Export Address Table (EAT). The Export Address Table contains the information necessary to find the specifically requested function(s) in the dynamic library. The module requesting the service has both an Import Lookup Table (ILT) and an Import Address Table (IAT). The Import Lookup Table contains information about which dynamic library are needed and which functions in each library are used. When the requesting module is loaded into memory for whatever reason, the core operating system scans the associated Import Lookup Table for any dynamic libraries the module depends on and loads those DLLs into memory. Once the specified modules are loaded, the requesting modules Import Address Table is updated by the operating system with the address(location) of each function that maybe accessed in each of the dynamically loaded libraries. Once again, in other environments, different implementations are possible.

In the exemplary embodiment, after the nmplagnt module is loaded by the prescribed method above, it hooks the Policy Agent's calls to the conventional Microsoft Windows Winsock functions WSASocket, WSAIoctl, WSAEventSelect, closesocket, and WSACleanup. After this process is executed, whenever the Policy Agent module attempts to register for notification of address changes, the request is redirected to the network-virtualizing component. As previously mentioned, the network-virtualizing component by design is aware of changes in network attachment. When it detects a change to the point of presence address, it sends the appropriate notifications to the Policy Agent module. In the illustrative embodiment, this causes the Policy Agent module to query for the current address list. Thus, the Policy Agent and consequently the ISAKMP/IKE module are informed of any address list changes.

FIG. 8 is an example of how in the illustrative embodiment a single function from a single DLL might be linked into a calling process. In more detail, the operating system searched the ILT, found a need for target.dll, loaded target.dll into app.exe's address space, located TargetFunc in target.dll's EAT, and fixed up app.exe's IAT entry to point to TargetFunc in target.dll. Now when app.exe calls its stubbed TargetFunc, the stub function will call through the IAT to the imported TargetFunc. Because all of the calls of interest go through the IAT, the preferred exemplary embodiment is able to hook its target functions simply by replacing the corresponding entry for each function in the IAT as shown in FIG. 9. This also has the advantage of localizing the hooking. Only the calls made by the requesting module in the target process are hooked. The rest of the system continues to function normally.

In summary, the illustrative embodiment in one exemplary detailed implementation performs the following steps:
1. Call OpenProcess to obtain access to the policy administration, security negotiation, and key management (Policy Agent/ISAKMP/IKE) process(es) and address space
2. Use ReadProcessMemory function to find the LoadLibrary function in the associated process(es)' address space.
3. Using the VirtualAllocEx function, allocate enough memory to hold the inject illustrative code shown in step 4 in the specified process(es)' address space.
4. Use WriteProcessMemory to inject the following code into the memory allocated in step 3:
    LoadLibrary(&targetlibraryname);
    label targetlibraryname:
        "C:\\Program Files\\NetMotion client\\nmplagnt.dll"
The address of the LoadLibrary function was determined in step 2. The data bytes at label targetlibraryname will vary depending on the name of the module being loaded, where the corresponding module is located, and the operating system environment.
5. Call the CreateRemoteThread function to run the injected code.
6. Wait for the remote thread to exit.
7. Free the allocated memory
8. Close the process.

At the end of these steps, the nmplagnt module has been injected into the policy administration, security negotiation, and key management (Policy Agent/ISAKMP/IKE) process(es) where it is able to redirect the processing of the needed function calls. It is understood that the above code procedure is operating system and processor dependent and is only shown for illustrative purposes, thus not limiting to this specific sequence or operation. Furthermore, the executable code responsible for adding these components to the operating environment can be provided to the mobile device via storage on a storage medium (e.g., optical disk) and/or by downloading over the network A similar method is employed using the FreeLibrary function instead of LoadLibrary function to reverse the hooking process and to unload the nmplagnt module. For the sake of brevity, the description is kept minimal, as anyone schooled in the art should be able to achieve the desired results.

Example Mobility Server Architecture

Using IPSec methodology for communication between the mobility server and peer hosts is a different set of problems to solve—although it uses some of the same techniques used on the mobility client. FIG. 10 shows an exemplary server architecture. In the exemplary illustrative embodiment, the mobility server MS can also be based on a Windows 2000/XP (or any other) operating system. In this particular illustrative implementation, a hooking module is also used in the illustrative embodiment—but the functions intercepted by the hooking module in the case of mobility server MS are redirected to the proxy and filter modules that are also supplied by the preferred exemplary embodiment, instead of the network-virtualization module.

In the exemplary mobility server, a proxy driver (nmproxy) can be used to implement the bulk of the mobility server functionality. However, in one exemplary implementation, there are three separate problems to solve for which three additional logical modules are used. They are:
    a network identity mapping driver (nmprtmap),
    an IPSec filter driver (nmipsec), and
    the security negotiation hooking library (nmike).

The first problem is how to manage virtual addresses for the mobility clients. Although it is possible in some network stack implementations to assign multiple addresses to the inherent networking stack components of the operating system, some systems do not support such functionality. To support the more restrictive implementation, the illustrative example embodiment employs the use of an identity mapping technique. It will be appreciated that the techniques herein are both compatible with and complimentary to either implementation, and such identity mapping functionality allows the security functionality to successfully operate within the more restrictive environments. The illustrative mobility server opens a communications endpoint associated with a local address and port and then identity maps between the corresponding virtual address(es) and port(s) before packets are processed by the protocol stack during reception and before they are transmitted out on the network. That mapping is the job of the network identity mapping module (nmprtmap) in one exemplary embodiment. For example, assume an application on a mobility client opens TCP port 21 on virtual address 10.1.1.2. Through the use of previously-defined mechanisms (see for example U.S. patent application Ser. No. 09/330,310 filed Jun. 11, 1999, entitled "Method And Apparatus For Providing Mobile and Other Intermittent Connectivity In A Computing Environment), this request is transferred from the mobility client to the mobility server. In response, the MS opens the connection on its local address 10.1.1.1 on port 2042 and registers the appropriate mapping with the network identity mapping module. When the mobile client together with proxy driver (nmproxy) then wishes to send data on its newly opened connection, the packet generated by the inherent networking stack will have a source address of 10.1.1.1 port 2042. The network identity mapping module will then match the frame's protocol/address/port tuple against its mapping table and replace the source address with 10.1.1.2 port 21 before the packet is transmitted on network. The reverse operation is performed for received packets. Using this network identity mapping technique allows the mobility server to communicate to peer systems using virtualized addresses without requiring modification to the core operating system transport protocol stack The second problem is a direct result of this mapping technique. Because the network identity mapping module logically operates below IPSec module (i.e. processes frames before during reception and after during transmission), it cannot directly manipulate IPSec protected frames without corrupting the packets or being intimately involved in the privacy or authenticating process. To address this issue, in one exemplary embodiment, the aforementioned IPSec filter module (nmipsec) inserts itself between the operating systems networking stack components and the associated IPSec modules. The filter module inspects each outgoing packet before IPSec protects the packet and each incoming packet after IPSec removes any encoding. Once in control of the frame, it consults the network identity mapping module(nmprtmap) to determine whether or not the frames source or destination identity should be mapped. In this way, the functionality of the mapping logic is moved to a level where is can perform its function without interfering with the IPSec processing.

Hooking the link between the IPSec and networking stack components is implementation and operating system dependent. In the illustrative exemplary embodiment, again the hooking process is completed by the manipulation of tables that are exchanged between the inherent IPSec and networking stack modules—but other implementations and environments could rely on other techniques. In the illustrative embodiment the IPSec filter module (nmipsec) loads before the IPSec module but after the transportprotocol module. When the IPSec module attempts to exchange its function table with the transport protocol components, the IPSec filter module (nmipsec) records and replaces the original function pointers with it's own entry points. Once the associated tables are exchanged in this manner, the IPSec filter module (nmipsec) can manipulate the contents of and control which packets the inherent IPSec module operates on.

The third issue is where the hooking techniques also used by the mobility clients is employed. As mentioned previously, due to the mapping technique employed in one exemplary implementation, the inherent networking stack has no knowledge of the mobility client's virtual address(es). Consequently, the policy administration, security negotiation, and key management (Policy Agent/ISAKMP/IKE module) process(es) are also not cognizant of these additional known network addresses. Therefore, there are no IPSec security policies to cover frames received for or transmitted from the mobility client's virtual address(es). Furthermore the security negotiation module (in this case the ISAKMP/IKE module) has no communications end point opened for which to negotiate security associations for the mobility client. To address this issue in the exemplary embodiment, the security negotiation hooking module(nmike) can employ the same hooking methodology described for the mobility client and illustrated in FIG. 8. The security negotiation hooking module (nmike) intercepts any address change notification request. When the proxy modules registers or deregisters a mobility client's virtual address(es) with the network identity mapping module (nmprtmap), it also informs the security negotiation hooking module(nmike). This module in turn then informs the policy administration module (Policy Agent) of the respective change. When either the policy administration (Policy Agent) or the security negotiation (ISAKMP/IKE) module requests a list of the current addresses via the conventional Microsoft Windows GetIpAddrTable function call, the security negotiation hooking module (nmike) intercepts the request and adds all of the current virtual addresses to the returned list. When the policy administration module (Policy Agent) sees the respective virtual addresses in the list, it treats them as actual addresses and creates the appropriate policies for the IPSec module. In response to the modification of the network address list, the security negotiation (ISAKMP/IKE) module will attempt to open and associate a communications endpoint for each address in the list. However, as mentioned previously, since the inherent networking stack in the illustrative embodiment is ignorant to the fact of these additional network addresses due to the aforementioned mapping methodology, this operation will generally fail. To solve this problem, the security negotiation hooking module (nmike) intercepts the request to the conventional Microsoft windows Winsock bind function and modifies the requested virtual address and port with a INADDR_ANY. Once the endpoint is bound through the inherent transport protocol stack, the security negotiation hooking module (nmike) employs the services of the network identity mapping module (nmprtmap) and creates a mapping between the actual address and port associated with the newly established communications end point to the virtual address and the assigned port for security negotiations (in this case port 500 is the standard ISAKMP port). Finally, the security negotiation hooking module (nmike) registers the actual address and port with IPSec filtering module (nmipsec) to instruct the module to pass packets to and from the specified address without further IPSec filter processing.

All documents referenced herein are incorporated by reference as if expressly set forth herein.

While the invention has been described in connection with practical and preferred embodiments, it is not to be so limited. Specifically, for example, the invention is not limited to IPSec or Microsoft operating systems. IPSec and related technologies can be arranged in a number of manners, executing with some of the required algorithms executing either in software or hardware. To wit, certain implementations may include hardware accelerator technology for the ciphering process, etc. Many network interface and computer manufactures have commercially available products that are used for this exact purpose. It is to be appreciated that the above specifications however describes the logical placement of required functionally and may actually execute in a distributed fashion. Accordingly, the invention is intended to cover all modifications and equivalent arrangements within the scope of the claims.

We claim:

1. In a data communications environment providing seamless transparent roaming of mobile computing devices, said environment including:

a plurality of data networks or subnetworks capable of communicating Internet Protocol packet-based data;

at least one mobile computing device coupled to at least one of said plurality of data networks or subnetworks, said at least one mobile computing device capable of roaming between said plurality of data networks or subnetworks, said at least one mobile computing device executing a client application that uses a TCP application session; and a mobility server that is coupled to at least one of said plurality of data networks or subnetworks, the mobility server intermediating communication between said at least one mobile computing device and at least one further network-connected computing device, wherein said at least one mobile computing device communicates privately and securely, at least in part through the use of cryptographic security services, with said mobility server at least in part via at least one of said plurality of data networks or subnetworks, a method of facilitating private and secure communications with said at least one mobile computing device via at least one of said data networks or subnetworks as said at least one mobile computing device roams, between said data networks or subnetworks, the method comprising:

(a) establishing at least one IP security association via at least one of said data networks or subnetworks between said at least one mobile computing device and said mobility server;

(b) detecting with said at least one mobile computing device whether said at least one mobile computing device has roamed between said data networks or subnetworks, (c) in response to said detection, terminating said established IP security association for use by said at least one mobile computing device; and (d) nevertheless supporting said application TCP session even though the IP security association has been terminated while shielding mobile computing device client applications and operating system components from periods of network disconnectedness, by reinstantiating the IP Security association upon roaming including renegotiating a secure session once network connectivity is reestablished while hiding the change from the client applications and operating system components with a software layer above IP security association so the application TCP session does not disconnect even when the at least one mobile computing device becomes temporarily disconnected during roaming, thereby providing a roamable, secure communications tunnel that persists beyond said termination of said established IP security association and automatically roams with said at least one mobile computing device.

2. The method of claim 1 wherein said detecting comprises detecting a change in network point of attachment.

3. The method of claim 1 wherein said detecting comprises detecting that an interruption of network connectivity has caused a previous IP Security session to be terminated.

4. The method of claim 1 wherein said detecting comprises detecting that a network identity of said at least one mobile computing device has changed.

5. The method of claim 1 wherein said detecting comprises detecting that said at least one mobile computing device has roamed to a different network or subnetwork.

6. The method of claim 1 wherein said step (c) includes negotiating a new IP Security session to replace a previously established but lost IP Security session in a manner that is transparent to an application running on said at least one mobile computing device.

7. The method of claim 1 wherein said step (c) includes using IP Security functionality to create said secure tunnel through at least one network or subnetwork and said step (d) comprises roaming said secure tunnel between said data networks or subnetworks.

8. The method of claim 1 further comprising applying policy rules to selectively allow, deny or delay the flow of network communications via said IP Security association.

9. The method of claim 1 further comprising managing and distributing policy regarding the establishment of an IP Security session from a central or distributed authority.

10. The method of claim 1 further comprising securely proxying, with said mobility server, said private and secure communications between said at least one mobile computing device and said at least another computing device.

11. The method of claim 1 further comprising terminating a previous IP Security session based on said detecting.

12. In a data communications environment providing seamless and transparent roaming of mobile computing devices, said environment including:

a plurality of data networks or subnetworks capable of communicating Internet Protocol packet-based data;

at least one mobile computing device capable of roaming between said plurality of data networks or subnetworks, said at least one mobile computing device providing a client application that uses a client application TCP session and has an IPSec security layer;

at lest one further computing device; and a mobility server that is coupled to at least one of said plurality of data networks or subnetworks the mobility server intermediating communication between said at least one mobile computing device and the at least one further computing device, wherein said at least one mobile computing device communicates privately and securely, through the use of cryptographic security services, with said mobility server at least in part via at least one of said plurality of data networks or subnetworks, a system for facilitating secure network communications with said at least one mobile computing device via said at least one data network or subnetwork, said system comprising:

a detector provided at the at least one mobile computing device that detects network disconnectedness, and a security module that, in response to detected occurrence of an event affecting network communications with said at least one mobile computing device, terminates an IP Security association for use by said at least one mobile computing device and renegotiates a secure session once network connectivity is reestablished while shielding said network disconnectedness from the mobile computing device client application so the client application TCP session does not disconnect during mobile computing device roaming, by reinstantiating an IP security association upon roaming and hiding the change from the client applications and operating system components with a software layer above the IPSec security layer.

13. The system of claim 12 wherein said detector detects a change in network point of attachment.

14. The system of claim 12 wherein said detector detects that an interruption of network connectivity has caused a previous IP Security session to be terminated.

15. The system of claim 12 wherein said at least one mobile computing device has a network identifier associated therewith, and said detector detects that the network identifier of said at least one mobile computing device has changed.

16. The system of claim 12 wherein said detector detects that said at least one mobile computing device has roamed to a different network or subnetwork.

17. The system of claim 12 wherein said security module negotiates a new IP Security session to replace a previously established but lost IP Security session in a manner that is transparent to at least one networked application operating on said at least one mobile computing device.

18. The system of claim 12 wherein said security module uses IPSec to create a secure session through network communication.

19. The system of claim 12 further comprising a policy manager that applies policy rules to selectively allow, deny or delay flow of network communications over an IP Security session.

20. The system of claim 12 further comprising a policy management authority that centrally manages and distributes policy regarding establishment of an IP Security session.

21. The system of claim 12 wherein said mobility server securely proxies mobile computing device communications.

22. The system of claim 12 wherein the security module terminates a previous IP Security session based on said detection.

* * * * *